(12) United States Patent
Doi

(10) Patent No.: US 7,853,293 B2
(45) Date of Patent: Dec. 14, 2010

(54) TRANSMISSION METHOD AND RADIO APPARATUS UTILIZING THE TRANSMISSION METHOD

(75) Inventor: Yoshiharu Doi, Gifu (JP)

(73) Assignee: Sanyo Electric Co., Ltd., Osaka (JP)

(*) Notice: Subject to any disclaimer, the term of this patent is extended or adjusted under 35 U.S.C. 154(b) by 1352 days.

(21) Appl. No.: 10/780,736

(22) Filed: Feb. 19, 2004

(65) Prior Publication Data

US 2004/0176137 A1  Sep. 9, 2004

(30) Foreign Application Priority Data

Mar. 4, 2003  (JP) ............................... 2003-057663

(51) Int. Cl.
*H04M 1/00* (2006.01)

(52) U.S. Cl. .................... 455/562.1; 455/410; 455/411; 455/426.1

(58) Field of Classification Search ................ 455/410, 455/411, 426, 456.1
See application file for complete search history.

(56) References Cited

U.S. PATENT DOCUMENTS

| | | | | |
|---|---|---|---|---|
| 5,448,753 A | * | 9/1995 | Ahl et al. ................. | 455/422.1 |
| 6,061,025 A | * | 5/2000 | Jackson et al. ......... | 343/700 MS |
| 2004/0152470 A1 | * | 8/2004 | Spain ....................... | 455/456.1 |
| 2004/0203908 A1 | * | 10/2004 | Hind et al. ............... | 455/456.1 |
| 2007/0165552 A1 | * | 7/2007 | Kasapi et al. ............ | 370/312 |

FOREIGN PATENT DOCUMENTS

JP  P2002-77015 A  3/2002

\* cited by examiner

Primary Examiner—Edward Urban
Assistant Examiner—Fayyaz Alam
(74) Attorney, Agent, or Firm—McDermott Will & Emery LLP

(57) ABSTRACT

From received digital signals and a reference signal, a response vector computing unit computes a received response vector as a received response characteristic of the received signals against a transmission signal. The received response vector computed by the response vector computing unit is stored in a desired terminal response vector table. A virtual response vector for a virtual interception terminal apparatus is stored in a virtual intercepting terminal response vector table. A transmission weight vector computing unit computes a transmission weight vector necessary for weighting a transmission information signal from the received response vector and the virtual response vector, using a Wiener solution. A multiplication unit weights the transmission information signals with the respective transmission weight vectors so as to output transmission digital signals.

14 Claims, 14 Drawing Sheets

FIG.5

| DATA No. | hb1 | hb2 | hb3 | hb4 |
|---|---|---|---|---|
| 1 | (hb1I1, hb1IQ) | (hb12I, hb12Q) | (hb13I, hb13Q) | (hb14I, hb14Q) |
| 2 | (hb21I, hb21Q) | (hb22I, hb22Q) | (hb23I, hb23Q) | (hb24I, hb24Q) |
| 3 | (hb31I, hb31Q) | (hb32I, hb32Q) | (hb33I, hb33Q) | (hb34I, hb34Q) |
| M−1 | (hb(M−1)1I, hb(M−1)1Q) | (hb(M−1)2I, hb(M−1)2Q) | (hb(M−1)3I, hb(M−1)3Q) | (hb(M−1)4I, hb(M−1)4Q) |
| M | (hbM1I, hbM1Q) | (hbM2I, hbM2Q) | (hbM3I, hbM3Q) | (hbM4I, hbM4Q) |

FIG.11

| DATA No. | hb1 | hb2 | hb3 | hb4 | TXP |
|---|---|---|---|---|---|
| 3 | (hb311, hb31Q) | (hb321, hb32Q) | (hb331, hb33Q) | (hb341, hb34Q) | A3 |
| 4 | (hb411, hb41Q) | (hb421, hb42Q) | (hb431, hb43Q) | (hb441, hb44Q) | A4 |
| 5 | (hb511, hb51Q) | (hb521, hb52Q) | (hb531, hb53Q) | (hb541, hb54Q) | A5 |
| M-3 | (hb(M-3)11, hb(M-3)1Q) | (hb(M-3)21, hb(M-3)2Q) | (hb(M-3)31, hb(M-3)3Q) | (hb(M-3)41, hb(M-3)4Q) | AM-3 |
| M-2 | (hb(M-2)11, hb(M-2)1Q) | (hb(M-2)21, hb(M-2)2Q) | (hb(M-2)31, hb(M-2)3Q) | (hb(M-2)41, hb(M-2)4Q) | AM-2 |

FIG.13

| CORRELATION VALUE | TRANSMISSION POWER |
|---|---|
| $C_1$ | $A_1$ |
| $C_2$ | $A_2$ |
| $C_3$ | $A_3$ |
| $C_{L-1}$ | $A_{L-1}$ |
| $C_L$ | $A_L$ |

TRANSMISSION METHOD AND RADIO APPARATUS UTILIZING THE TRANSMISSION METHOD

BACKGROUND OF THE INVENTION

1. Field of the Invention

The present invention relates to technologies by which to transmit data to radio terminals which are targeted communication parties, and wireless technologies utilizing such transmission technologies, and it particularly relates to a transmission method for controlling the directional patterns of antennas and radio apparatus utilizing the transmission method.

2. Description of the Related Art

In wireless communication, it is generally desired that the limited frequency resources be used effectively. Adaptive array antenna technology is one of the technologies that can realize effective utilization of frequency resources. In adaptive array antenna technology, the amplitude and phase of signals transmitted and received by a plurality of antennas, respectively, are so controlled as to form a directional pattern of the antenna for transmission and receiving. In other words, the apparatuses provided with adaptive array antennas change the amplitude and phase of signals received by their respective antennas, add up the thus changed received signals, and receive the signals equivalent to the signals received by the antenna having the directional pattern corresponding to the variation in the said amplitude and phase (hereinafter referred to as "weight"). In addition, signals are transmitted in a directional pattern of the antenna corresponding to the weight.

One example of weight computation in adaptive array antenna technology is a processing based on the MMSE (Minimum Mean Square Error) method. In the MMSE method, the Wiener solution is known to be the condition for an optimum weight value. Also known is a recurrence formula that converges to the optimum value with smaller amounts of calculation than directly solving the above-mentioned condition. For such recurrence formula, adaptive algorithms, such as RLS (Recursive Least Squares) algorithm and LMS (Least Mean Squares) algorithm, are used (See reference (1) in the following Related Art List, for instance).

3. Related Art List (1) Japanese Patent Application Laid-Open No. 2002-77015.

With adaptive array antennas, radio signals are transmitted and received according to a directional pattern formed based on a weighting control to find an optimum weight value in response to changes in the radio wave environment in the wireless-communication covered area. Accordingly, there would be little change in the directional pattern if there is no significant change in the radio environment. The radio signals transmitted from a wireless base station apparatus equipped with adaptive array antennas can be received not only by targeted wireless terminal apparatuses, which are intended communication parties, but also by other wireless terminal apparatuses, that are not targeted communication parties, which happen to be located within the range of the directional pattern of the adaptive array antenna used. Particularly in the radio environment where there is little change in the directional pattern of the adaptive array antennas, there are possibilities that the radio signals are continuously received by unwanted radio terminals which are unintended communication parties, thus breaching the security of information contained in the radio signals. Moreover, the above security-related problem is not limited to adaptive array antennas but can also occur with antennas with any fixed directional pattern or non-directional antennas.

SUMMARY OF THE INVENTION

The present invention has been made in recognition of the foregoing circumstances and an object thereof is to provide a transmission method capable of preventing radio signals sent to targeted wireless apparatus in a communication from being continuously received by radio terminal apparatus that are not targeted therein, and a radio apparatus using said transmission method. Another object thereof is to provide a transmission method capable of controlling the weight irrespective of the radio environment, and a radio apparatus using said transmission method. Still another object thereof is to provide a transmission method capable of holding a predetermined value for the intensity of signals to be transmitted to targeted wireless apparatus while controlling the weight irrespective of the radio environment, and a radio apparatus using said transmission method.

A preferred embodiment according to the present invention relates to a radio apparatus. This apparatus includes: a computing unit which computes a received response vector of a terminal apparatus which is a targeted communication party, based on signals received from the targeted terminal apparatus; an acquiring unit which acquires a virtual response vector of a virtual terminal apparatus different from the targeted terminal apparatus; a generator which generates a transmission weight vector based on the received response vector computed by the computing unit and the virtual response vector acquired by the acquiring unit; and a transmitter which transmits a predetermined signal to the targeted terminal apparatus based on the transmission weight vector generated by the generator. In this apparatus, the acquiring unit may acquire again, as appropriate, a virtual response vectors and the thus reacquired virtual response vector may be again subject to the processings by the generator and the transmitter.

Another preferred embodiment according to the present invention relates also to a radio apparatus. This apparatus includes: a computing unit which computes a received response vector of a terminal apparatus which is a targeted communication party, based on signals received from the targeted terminal apparatus; an acquiring unit which acquires a virtual response vector of a virtual terminal apparatus different from the targeted terminal apparatus; a generator which generates a transmission weight vector based on the received response vector computed by the computing unit and the virtual response vector acquired by the acquiring unit; and a transmitter which transmits a predetermined signal to the targeted terminal apparatus based on the transmission weight vector generated by the generator and, in this apparatus, the acquiring unit may reacquire, as appropriate, a virtual response vector whose value of correlation with the received response vector computed by the computing unit is less than or equal to a predetermined threshold value, and the thus reacquired virtual response vector may be again subject to the processings by the generator and the transmitter.

The to "reacquire" includes changing parameters contained in the already acquired virtual response vector or updating the parameters contained in the already acquired virtual response vector, in addition to acquiring another virtual response vector which is different from the already acquired virtual response vector. Thus, to "reacquire" is involved if the value of a vector, which is of the virtual or potential nature, is changed finally.

The acquiring unit may further include: a storage which stores a plurality of virtual response vectors whose values of mutual correlation therewith are less than or equal to a predetermined threshold value; and a selector which selects a virtual response vector from the plurality of virtual response vectors stored in the storage.

"To select a virtual response vector" includes, here, selecting a parameter for calculating the virtual response vector and then computing the virtual response vector based on said parameter, in addition to selecting the virtual response vector itself.

The radio apparatus may further include: a measuring unit which measures the intensity of a signal received from the targeted terminal apparatus; and an intensity determining unit which instructs the acquiring unit to switch to the virtual response vector whose value of correlation with the received response vector computed by the computing unit becomes less than or equal to a predetermined threshold value if a signal strength value of the targeted terminal apparatus, which is calculated from the transmission weight vector, the received response vector and information on the intensity of the received signal measured by the measuring unit, is less than or equal to a threshold value.

The radio apparatus according may further include: a measuring unit which measures the intensity of a signal received from the targeted terminal apparatus; and an intensity determining unit which instructs the acquiring unit to increase the intensity of signals to be transmitted to the targeted terminal apparatus if a signal strength value of the targeted terminal apparatus, which is calculated from the transmission weight vector, the received response vector and information on the intensity of the received signal measured by the measuring unit, is less than or equal to a threshold value.

"Directional information and information on the intensity" include not only direct information but also the indirect information. Specifically, the direct information is the information on direction and intensity measured directly by the measuring unit whereas the indirect information is the information such that the values measured by the measuring unit are expressed by or in the form of a function of direction and intensity, and so forth.

The intensity determining unit may estimate the signal strength value of the targeted terminal apparatus from a value of correlation between the received response vector and the virtual response vector.

By employing the above apparatuses, the directional information contained in the virtual response vector is updated as appropriate and thereby the direction of the transmission weight vector is changed as well. Thus, it is possible to prevent the transmission signals from being continuously received by the untargeted terminal apparatus.

Still another preferred embodiment according to the present invention relates to a transmission method. This method performs a control in such a manner that a value of the intensity of a signal received by a terminal apparatus, which is a targeted communication party, is maintained at a predetermined value, and varied as appropriate is a direction in which a value of signal strength for a terminal apparatus, which is other than the targeted terminal apparatus, is small.

Still another preferred embodiment according to the present invention relates also to a transmission method. This method generates a transmission weight vector used in transmitting a predetermined signal to a terminal apparatus, which is a targeted communication party, from a received response vector of the targeted terminal apparatus and a virtual response vector of a potentially or virtually intercepting terminal apparatus, and performs a control in such a manner that the virtual response vector is changed, as appropriate, to a virtual response vector having a different value from the virtual response vector.

Still another preferred embodiment according to the present invention relates also to a transmission method. This method includes: computing a received response vector of a terminal apparatus which is a targeted communication party, based on signals received from the targeted terminal apparatus; acquiring a virtual response vector of a virtual terminal apparatus which is not the targeted terminal apparatus; generating a transmission weight vector based on the received response vector computed in the computing and the virtual response vector acquired in the acquiring; and transmitting a predetermined signal to the targeted terminal apparatus based on the transmission weight vector generated by the generating. In this method, the acquiring a virtual response vector may be such that a virtual response vector is acquired again, as appropriate, and the thus reacquired virtual response vector is again subject to the processings by the generating a transmission weight vector and the transmitting a predetermined signal.

Still another preferred embodiment according to the present invention relates also to a transmission method. This method includes: computing a received response vector of a terminal apparatus which is a targeted communication party, based on signals received from the targeted terminal apparatus; acquiring a virtual response vector of a virtual terminal apparatus which is not the targeted terminal apparatus; generating a transmission weight vector based on the received response vector computed in the computing and the virtual response vector acquired in the acquiring; and transmitting a predetermined signal to the targeted terminal apparatus based on the transmission weight vector generated by the generating, and in this method the acquiring a virtual response vector may be such that a virtual response vector whose value of correlation with the received response vector computed by the computing is less than or equal to a predetermined threshold value is reacquired, as appropriate, and the thus reacquired virtual response vector is again subject to the processings by the generating a transmission weight vector and the transmitting a predetermined signal.

The acquiring a virtual response vector may include: storing a plurality of virtual response vectors whose values of mutual correlation therewith are less than or equal to a predetermined threshold value; and selecting a virtual response vector from the plurality of virtual response vectors stored in the storing.

The method may further include: measuring the intensity of a signal received from the targeted terminal apparatus; and instructing the acquiring a virtual response vector to switch to a virtual response vector whose value of correlation with the received response vector computed by the computing becomes less than or equal to a predetermined threshold value if a signal strength value of the targeted terminal apparatus, which is calculated from the transmission weight vector, the received response vector and information on the intensity of the received signal measured by the measuring unit, is less than or equal to a threshold value.

The method may further include: measuring the intensity of a signal received from the targeted terminal apparatus; and instructing the transmitting a predetermined signal to increase the intensity of signals to be transmitted to the targeted terminal apparatus if a signal strength value of the targeted terminal apparatus, which is calculated from the transmission weight vector, the received response vector and information on the intensity of the received signal measured by the measuring unit, is less than or equal to a threshold value.

The instructing to switch to a virtual response vector may be such that the signal strength value of the targeted terminal apparatus is estimated from a value of correlation between the received response vector and the virtual response vector. Moreover, the instructing to increase the intensity of signals may be such that the signal strength value of the targeted terminal apparatus is estimated from a value of correlation between the received response vector and the virtual response vector.

Still another preferred embodiment according to the present invention relates to a program. This program includes the functions of: computing a received response vector of a terminal apparatus which is a targeted communication party, based on signals received from the targeted terminal apparatus; acquiring a virtual response vector of a virtual terminal apparatus which is not the targeted terminal apparatus; generating a transmission weight vector based on the received response vector computed in the computing and the virtual response vector acquired in the acquiring; and transmitting a predetermined signal to the targeted terminal apparatus based on the transmission weight vector generated by the generating. In this program, the acquiring a virtual response vector may be such that a virtual response vector is acquired again, as appropriate, and the thus reacquired virtual response vector is again subject to the processings by the generating a transmission weight vector and the transmitting a predetermined signal.

Still another preferred embodiment according to the present invention relates also to a program. This program includes the functions of: computing a received response vector of a terminal apparatus which is a targeted communication party, based on signals received from the targeted terminal apparatus; acquiring a virtual response vector of a virtual terminal apparatus which is not the targeted terminal apparatus; generating a transmission weight vector based on the received response vector computed in the computing and the virtual response vector acquired in the acquiring; and transmitting a predetermined signal to the targeted terminal apparatus based on the transmission weight vector generated by the generating, and in this program the acquiring a virtual response vector may be such that a virtual response vector whose value of correlation with the received response vector computed by the computing is less than or equal to a predetermined threshold value is reacquired, as appropriate, and the thus reacquired virtual response vector is again subject to the processings by the generating a transmission weight vector and the transmitting a predetermined signal.

The acquiring a virtual response vector may further include: storing a plurality of virtual response vectors whose values of mutual correlation therewith are less than or equal to a predetermined threshold value; and selecting a virtual response vector from the plurality of virtual response vectors stored in the storing.

The program may further include: measuring the intensity of a signal received from the targeted terminal apparatus; and instructing the acquiring a virtual response vector to switch to a virtual response vector whose value of correlation with the received response vector computed by the computing becomes less than or equal to a predetermined threshold value if a signal strength value of the targeted terminal apparatus, which is calculated from the transmission weight vector, the received response vector and information on the intensity of the received signal measured by the measuring unit, is less than or equal to a threshold value.

The program may further include: measuring the intensity of a signal received from the targeted terminal apparatus; and instructing the transmitting a predetermined signal to increase the intensity of signals to be transmitted to the targeted terminal apparatus if a signal strength value of the targeted terminal apparatus, which is calculated from the transmission weight vector, the received response vector and information on the intensity of the received signal measured by the measuring unit, is less than or equal to a threshold value.

The instructing to switch to a virtual response vector may be such that the signal strength value of the targeted terminal apparatus is estimated from a value of correlation between the received response vector and the virtual response vector. Moreover, the instructing to increase the intensity of signals may be such that the signal strength value of the targeted terminal apparatus is estimated from a value of correlation between the received response vector and the virtual response vector.

It is to be noted that any arbitrary combination of the above-described structural components and expressions changed between a method, an apparatus, a system, a recording medium, a computer program and so forth are all effective as and encompassed by the present embodiments.

Moreover, this summary of the invention does not necessarily describe all necessary features so that the invention may also be sub-combination of these described features.

BRIEF DESCRIPTION OF THE DRAWINGS

FIG. 5 shows a data structure of a virtual intercepting terminal response vector table shown in FIG. 4.

FIG. 11 shows a data structure of a selected virtual intercepting terminal table shown in FIG. 10.

FIG. 13 shows a data structure of a correlation table of correlation values and transmission powers used for calculating the transmission power as shown in FIG. 12.

DETAILED DESCRIPTION OF THE INVENTION

Figure 1:
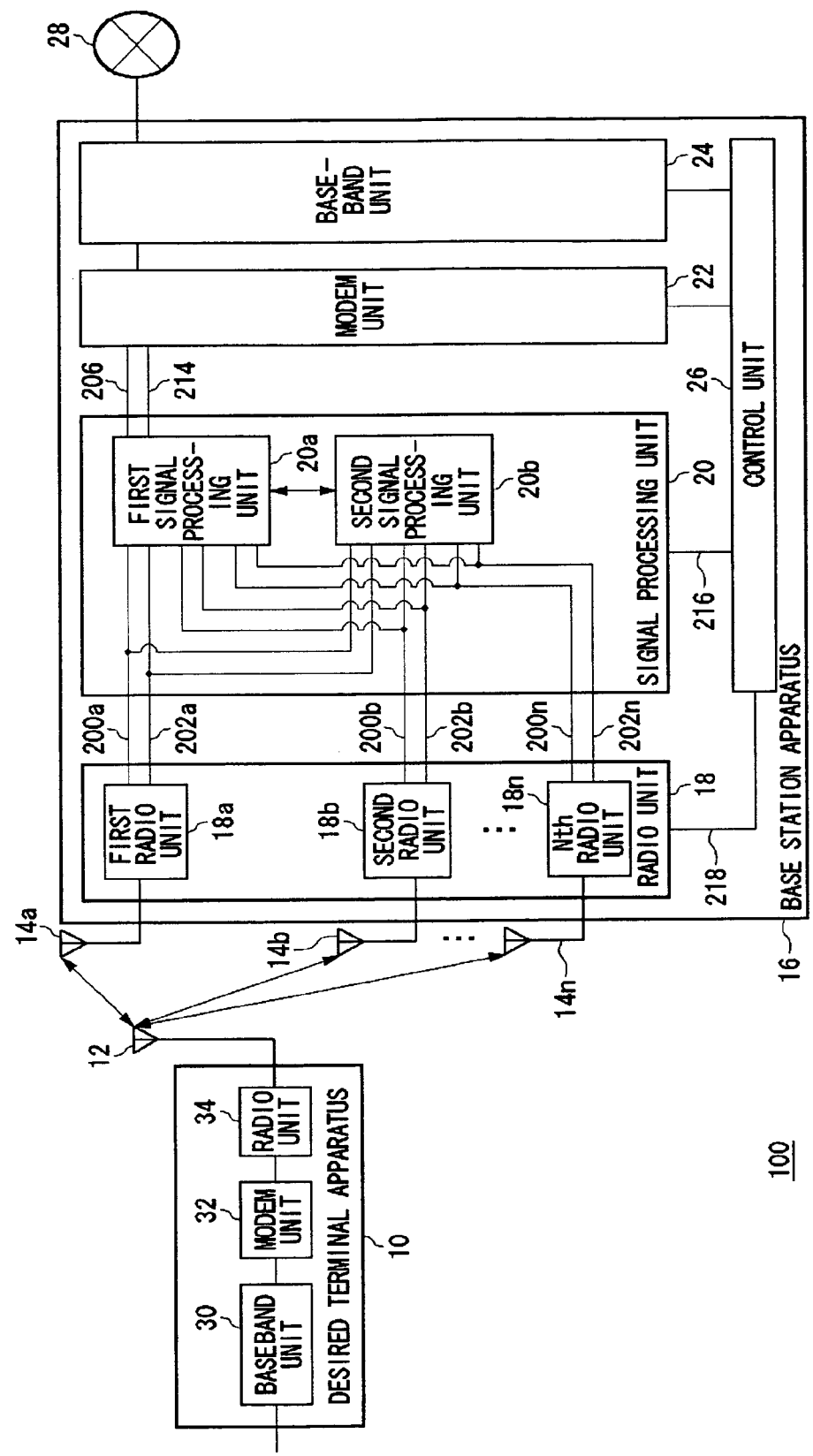
FIG. 1 shows a structure of a communication system according to a first embodiment of the present invention.

The invention will now be described based on the following embodiments which do not intend to limit the scope of the present invention but exemplify the invention. All of the features and the combinations thereof described in the embodiments are not necessarily essential to the invention.

First Embodiment

A first embodiment according to the present invention relates to a base station apparatus which can be connected to predetermined terminal apparatus. The base station apparatus according to the present embodiment is equipped with a plurality of antennas. A plurality of weighting factors (hereinafter referred to as "received weight vectors") are calculated adaptively based on signals which are sent from a terminal apparatus, which is a targeted party to the communication (hereinafter referred to as "desired terminal apparatus"), and which are received by the plurality of antennas of the base station apparatus. These signals received from the desired terminal apparatus are subject to an adaptive array signal processing at the time of receiving. Then, response factors (hereinafter referred to as "received response vectors") are computed based on the signals sent from the desired terminal apparatus and received by the respective antennas. Then, a plurality of weighting factors (hereinafter referred to as "transmission weight vectors") are derived from the received response vectors. Moreover, signals to be transmitted are weighted respectively with the transmission weight vectors, and are then transmitted through the plurality of antennas to the desired terminal apparatus. However, if there exists any terminal apparatus, which is not the targeted communication party, in the direction of a directional pattern of an antenna formed by the transmission weight vectors, it is possible that the signals sent from the base station apparatus to the desired terminal apparatus are also received by an untargeted terminal apparatus.

In order to prevent the transmitted signals from being received by any unintended terminal apparatus, the base station apparatus according to the present embodiment carries out the following in addition to the above-described adaptive array signal processing. That is, the base station apparatus acquires response factors (hereinafter referred to as "virtual response vector") coming from an untargeted terminal apparatus which is potentially or virtually present in a predetermined direction (hereinafter referred to as "virtual interception terminal apparatus" or "potentially intercepting terminal apparatus"). Then, from the received response vector and the virtual response vector, the base station apparatus computes a transmission weight vector to form an antenna's directional pattern such that the signal strength in the direction of the desired terminal apparatus becomes large whereas the signal strength in the direction of the virtual interception terminal apparatus becomes small. Furthermore, it changes, at predetermined time intervals, information on the direction of the virtual interception terminal apparatus contained in the virtual response vector, and changes, at predetermined time intervals, the direction in which the signal strength becomes small in the antenna's directional pattern.

FIG. 1 shows a structure of a communication system 100 according to the first embodiment of the present invention. The communication system 100 comprises a desired terminal apparatus 10 and a base station apparatus 16. The desired terminal apparatus 10 includes a baseband unit 30, a modem unit 32, a radio unit 34 and an antenna 12 for use with terminal apparatus. The base station apparatus 16 includes a first base station antenna 14a, a second base station antenna 14b, ... and an Nth basestation antenna 14n, which are generically called antennas 14 for use with the base station apparatus, a first radio unit 18a, a second radio unit 18b, ... and an Nth radio unit 18n, which are generically called a radio unit 18, a first signal processing unit 20a and a second signal processing unit 20b which are generically called a signal processing unit 20, a modem unit 22, a baseband unit 24 and a control unit 26. Moreover, the base station apparatus 16 includes a first received digital signal 200a, a second received digital signal 200b, ... and an Nth received digital signal 200n, which are generically called a received digital signal 200, a transmission digital signal 202a, a second transmission digital signal 202b, ... and an Nth transmission digital signal 202n, which are generically called a transmission digital signal 202, a synthesized signal 206, a transmission information signal 214, a signal processing control signal 216 and a radio control signal 218 as signals.

Here, the desired terminal apparatus 10 connected to the base station apparatus 16 is a targeted communication party of the base station apparatus 16. And terminal apparatuses, which are not the targeted communication parties of the base station apparatus 16, other than the desired terminal apparatus 10 are also called virtual interception terminal apparatuses as mentioned above. In FIG. 1, the virtual interception terminal apparatuses are omitted. A terminal apparatus which actually exists and is not the intended communication party is called an interference terminal apparatus. The interference terminal apparatus is also omitted in FIG. 1.

The baseband unit 30 is an interface with a PC connected to a desired terminal apparatus 10 or applications inside the desired terminal apparatus 10. The modem unit 32 carries out a modulation processing in which transmission signals are generated by modulating information signals to be transmitted. The modem unit 32 also carries out a demodulation processing in which information signals transmitted are reproduced by demodulating received signals. The radio unit 34 carries out frequency translation processing, amplification processing, A-D or D-A conversion processing and the like between the baseband signals and radio frequency signals, which are processed by the modem unit 32. The antenna 12 for use with terminal apparatus performs transmission/receiving processings of signals of radio frequencies.

The baseband unit 24 is an interface with a PC with a network 28. The baseband unit 24 may also carry out error correction or automatic retransmission processing, but the description of such processings is omitted here.

The modem unit 22 carries out a modulation processing in which transmission signals are generated by modulating information signals to be transmitted. The modem unit 22 also carries out a demodulation processing in which information signals transmitted are reproduced by demodulating received signals.

The signal processing unit 20 performs an adaptive antenna signal processing. In this example, the first signal processing unit 20 carries out an adaptive array signal processing with a desired terminal apparatus 10, and the second signal processing unit 20b carries out an adaptive array signal processing with an interference terminal apparatus.

The radio unit 18 carries out frequency translation processing, amplification processing, A-D or D-A conversion processing and the like between the baseband signals and radio frequency signals, which are processed by the signal processing unit 20, the modem unit 22 and the baseband unit 24.

The antennas 14 for use with base station apparatus receive and transmit radio frequency signals. The directivity of the antennas may be arbitrary and the number of antennas is denoted by N.

The control unit 26 controls operative timings for the radio unit 18, the signal processing unit 20, the modem unit 22 and the baseband unit 24.

Figure 2:
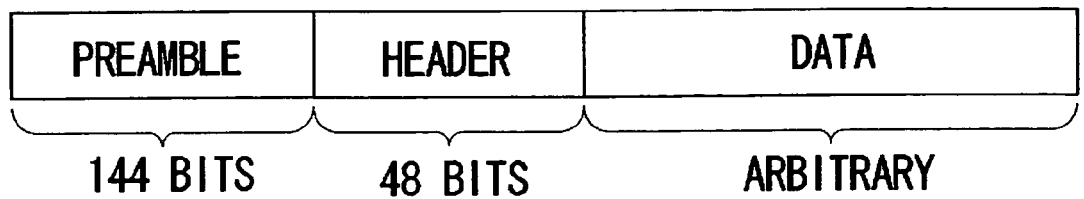
FIG. 2 shows a burst format according to the first embodiment.

FIG. 2 shows a burst format according to the first embodiment. This format is a burst format used in IEEE802.11b, which is one of standards for CSMA (Carrier Sense Multiple Access)-based wireless LAN (Local Area Network). A preamble is placed in the first 144 bits of the burst, and a header is placed in the subsequent 48 bits thereof. The preamble, which is known to the desired terminal apparatus 10 and the base station apparatus 16, can also be used as a training signal which will be described later.

Figure 3:
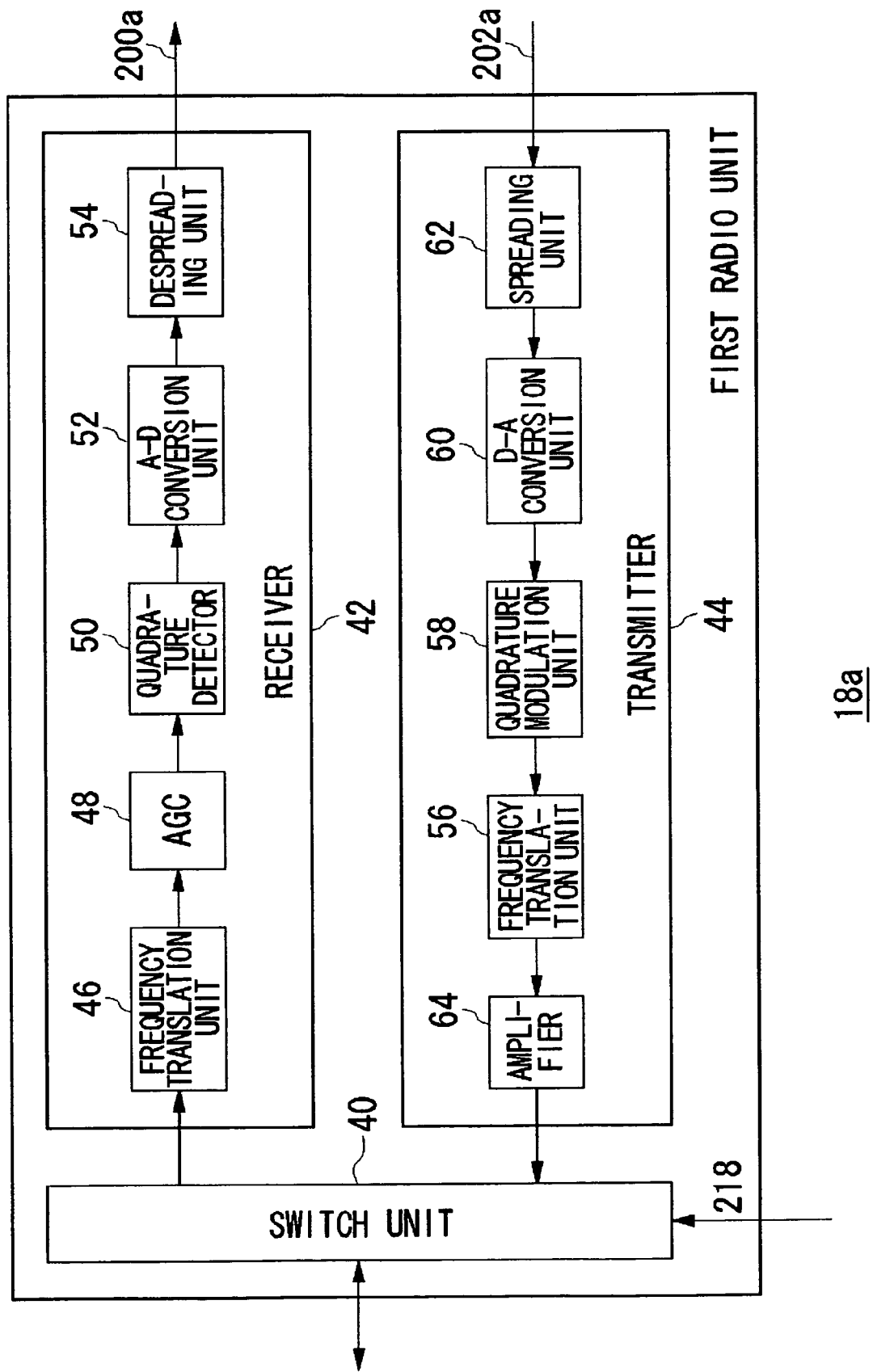
FIG. 3 shows a structure of a first radio unit shown in FIG. 1.

FIG. 3 shows a structure of a first radio unit 18a. The first radio unit 18a includes a switch unit 40, a receiver 42 and a transmitter 44. The receiver 42 includes a frequency translation unit 46, an AGC (Automatic Gain Control) 48, an quadrature detector 50, an A-D conversion unit 52 and a despreading unit 54. The transmitter 44 includes an amplifier 64, a frequency translation unit 56, an quadrature modulation unit 58, a D-A conversion unit 60 and a spreading unit 62.

The switch unit 40 switches input and output of signals to the receiver 42 and the transmitter 44 according to radio control signals 218 from the control unit 26.

The frequency translation unit 46 in the receiver 42 and the frequency translation unit 56 in the transmitter 44 perform frequency translation on targeted signals between radio frequencies and intermediate frequencies.

The AGC 48 controls gain automatically to make the amplitude of the received signals an amplitude within the dynamic range of the A-D conversion unit 52.

The quadrature detector 50 generates baseband analog signals by performing quadrature detection on intermediate frequency signals. On the other hand, the quadrature modulation unit 58 generates intermediate frequency signals by performing quadrature modulation on the baseband analog signals.

The A-D conversion unit 52 converts baseband analog signals into digital signals, and the D-A conversion unit 60 converts baseband digital signals into analog signals.

The despreading unit 54 performs an despreading processing on baseband digital signals by a predefined spreading code sequence. Here, the despreading-processed baseband digital signal which is outputted from the despreading unit 54 is called a first received digital signal 200a.

The spreading unit 62 performs a spreading processing on baseband digital signals by a predetermined spreading code sequence. Here, a baseband digital signal, to be spreading-processed, which is inputted to the spreading unit 62 is called a first transmission digital signal 202a.

The amplifier 64 amplifies radio frequency signals to be transmitted.

Figure 4:
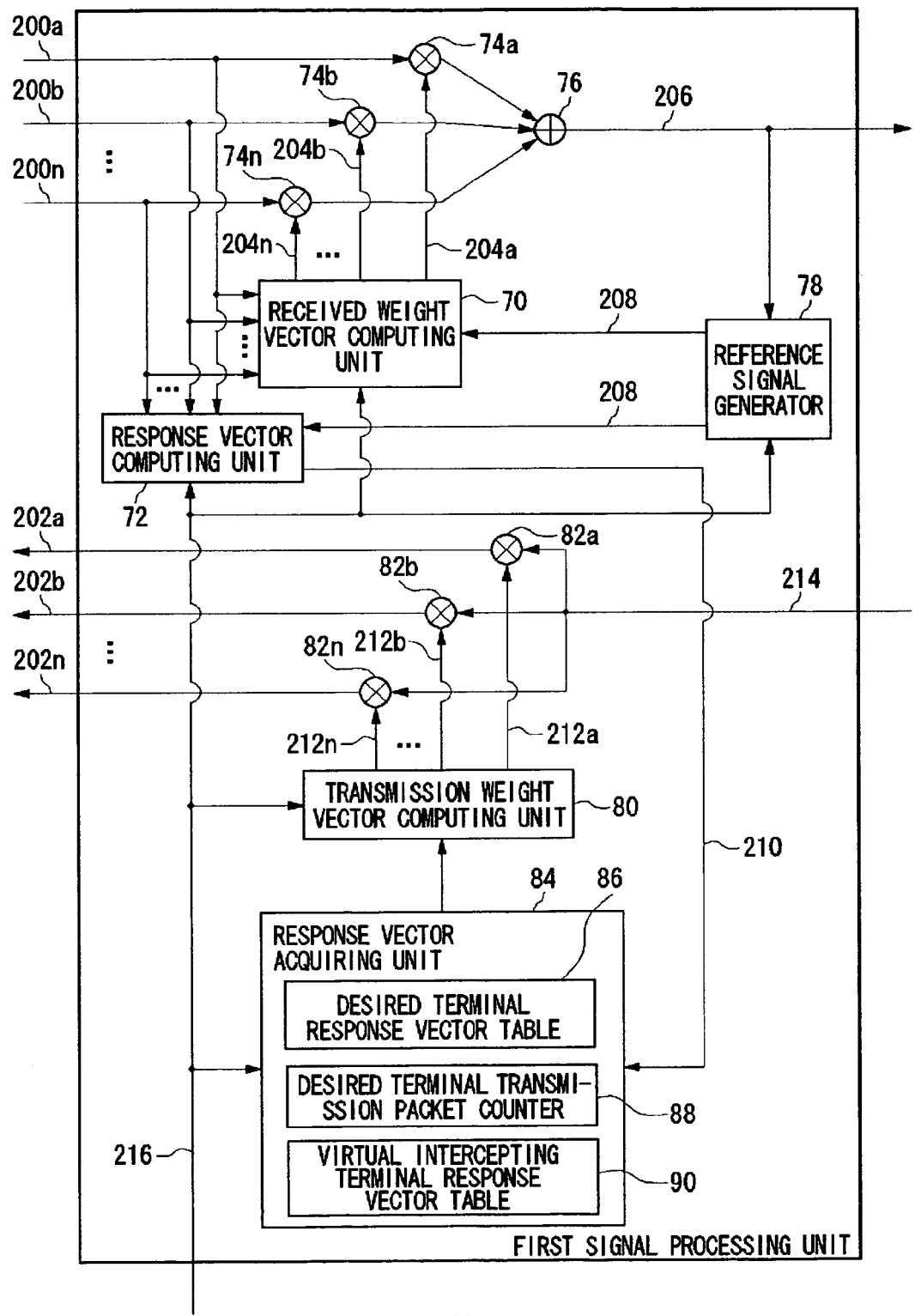
FIG. 4 shows a structure of a first signal processing unit shown in FIG. 1.

FIG. 4 shows a structure of a first signal processing unit 20a. The first signal processing unit 20a includes a received weight vector computing unit 70, a response vector computing unit 72, a first multiplication unit 74a, a second multiplication unit 74b, ... and an Nth multiplication unit 74n, which are generically named multiplication units 82, an addition unit 76, a reference signal generator 78, a transmission weight vector computing unit 80, a multiplication unit 82a, a second multiplication unit 82b, ... and an Nth multiplication unit 82n, which are generically named multiplication units 82, and a response vector acquiring unit 84. The response vector acquiring unit 84 includes a desired terminal response vector table 86, a desired terminal transmission packet counter 88 and virtual intercepting terminal response vector table 90. Moreover, the signals used include a first received weight vector 204a, a second received weight vector 204b, ... and an Nth received weight vector 204n, which are generically named received weight vectors 204, and a first transmission weight vector 212a, a second transmission weight vector 212b, ... and an Nth transmission weight vector 212n, which are generically named transmission weight vectors 212. It is to be noted here that each component of these may be a predetermined coefficient instead of a vector. The signals used also include a reference signal 208 and a received response vector 210.

The received weight vector computing unit 70 computes received weight vectors 204 necessary for weighting received digital signals 200 from the received digital signals 200 and the reference signal 208, using an adaptive algorithm, such as RLS (Recursive Least Squares) algorithm or LMS (Least Mean Squares) algorithm.

The multiplication unit 74 weights the received digital signals with the received weight vectors 204, and the addition unit 76 adds up the output of the multiplication unit 74 so as to output a synthesized signal 206.

During a training period, the reference signal generator 78 outputs as a reference signal 208 a preamble training signal stored in advance. After the training period, the synthesized signal 208 is compared with a predefined threshold value and then the result of the comparison is outputted as a reference signal 208. The decision may not necessarily be a hard decision but it may also be a soft decision.

From the received digital signals 200 and the reference signal 208, the response vector computing unit 72 computes the received response vector 210 as a received response characteristic of a received signal against a transmission signal. Suppose here that the number of antennas 14 of the base station apparatus is 4 and the number of desired terminal apparatus 10 is 1 and the number of interference terminal apparatus is 1. Then the received digital signals 200 which are received by the antennas 14 of the base station apparatus at time t are denoted by $x_1(t)$, $x_2(t)$, $x_3(t)$ and $x_4(t)$, respectively, and the reference signal 208 by $D(t)$ and the reference signal for the interference terminal apparatus by $U(t)$.

Then, the received signals 200 and a received signal vector $X(t)$ are expressed by the following equation (1).

$$x_1(t)=h_{11}D(t)+h_{12}U(t)+n_1(t)$$

$$x_2(t)=h_{21}D(t)+h_{22}U(t)+n_2(t)$$

$$x_3(t)=h_{31}D(t)+h_{32}U(t)+n_3(t)$$

$$x_4(t)=h_{41}D(t)+h_{42}U(t)+n_4(t)$$

$$X(t)=[x_1(t),x_2(t),x_3(t),x_4(t),]^T$$

$$HD=[h_{11},h_{21},h_{31},h_{41},]^T \quad \text{(Equation 1)}$$

where HD corresponds to the received response vector 210. Each element of received correlation values can be computed as follows from the received signal vector $X(t)$ and the reference signal 208, or $D(t)$, and the reference signal $U(t)$.

$$r_{11}=E[D^*(t)x_1(t)]=h_{11}+h_{12}E[D^*(t)U(t)]$$

$$r_{21}=E[D^*(t)x_2(t)]=h_{21}+h_{22}E[D^*(t)U(t)]$$

$$r_{31}=E[D^*(t)x_3(t)]=h_{31}+h_{32}E[D^*(t)U(t)]$$

$$r_{41}=E[D^*(t)x_4(t)]=h_{41}+h_{42}E[D^*(t)U(t)]$$

$$r_{12}=E[U^*(t)x_1(t)]$$

$$r_{22}=E[U^*(t)x_2(t)]$$

$$r_{32}=E[U^*(t)x_3(t)]$$

$$r_{42}=E[U^*(t)x_4(t)] \quad \text{(Equation 2)}$$

A correlation matrix R and its inverse matrix $R^{-1}$ are expressed by the following equation (3).

$$R = \begin{bmatrix} E[D^*(t)D(t)] & E[D^*(t)U(t)] \\ E[U^*(t)D(t)] & E[U^*(t)U(t)] \end{bmatrix}$$ (Equation 3)

$$R^{-1} = \begin{bmatrix} A & B \\ C & D \end{bmatrix}$$

Hence, each element of the received response vector 210 HD is expressed as follows from the inverse matrix of the correlation vector R and the received correlation vector.

$$h_{11} = Ar_{11} + Br_{12}$$

$$h_{21} = Ar_{21} + Br_{22}$$

$$h_{31} = Ar_{31} + Br_{32}$$

$$h_{41} = Ar_{41} + Br_{42}$$ (Equation 4)

An inner product y(t) of a weight vector Wu=[wu1, wu2, wu3, wu4] for the interference terminal apparatus, outputted form the second signal processing unit 20b, and the received signal vector X(t) is expressed by the following equation (5).

$$y(t) = wu_1 x_1(t) + wu_2 x_2(t) + wu_3 x_3(t) + wu_4 x_4(t)$$ (Equation 5)
$$= (wu_1 h_{11} + wu_2 h_{21} + wu_3 h_{31} + wu_4 h_{41})D(t) +$$
$$(wu_1 h_{12} + wu_2 h_{22} + wu_3 h_{32} + wu_4 h_{42})U(t) +$$
$$(wu_1 n_1(t) + wu_2 n_2(t) + wu_3 n_3(t) + wu_4 n_4(t))$$

In general, the equation (5) becomes zero due to the weight vector for the interference terminal apparatus. And if the SN ratio is sufficiently high, the noise component can be ignored. Hence, the following equation (6) holds.

$$y(t) = U(t)$$ (Equation 6)

From the above relations, the received response vector 210 HD is computed.

The received response vector 210 computed by the response vector computing unit 72 is stored in a desired terminal response vector table 86. If a plurality of desired terminal apparatuses 10 are connected to the base station apparatus 16, the respective received response vectors 210 corresponding to the plurality of desired terminal apparatuses 10 are stored in the desired terminal response vector table 86.

The virtual response vector for the virtual interception terminal apparatus is stored in a virtual intercepting terminal response vector table 90. A plurality of virtual response vectors may be stored. It is assumed here that the virtual interception terminal apparatuses which potentially surround a base station apparatus 16 exist in a plurality of directions, and a plurality of virtual response vectors are stored corresponding to the respective angles of directions in which the virtual interception terminal apparatuses exist. FIG. 5 is a table showing a data structure of the virtual intercepting terminal response vector table. In this table, hb1 to hb4 shown in the top row indicate components of the virtual response vectors corresponding to the respective antennas 14 of the base station apparatus 16. It is also assumed in the table that the data numbers 1 to M correspond to the respective different directions in which the virtual interception terminal apparatuses are located.

The desired terminal transmission packet counter 88 counts the number of packets transmitted to a desired terminal apparatus 10. Based on this counter value, the response vector acquiring unit 84 selects a virtual response vector from the virtual intercepting terminal response vector table 90. For example, if the counter value is 10, the virtual response vector of data 10 is selected. Similarly, if the counter value is M, the virtual response vector of data M is selected.

The transmission weight vector computing unit 80 computes the transmission weight vectors 212 necessary for weighting the transmission information signal 214, from the received response vector 210 and the virtual response vector, by using the Wiener solution. A complex correlation matrix CM and a complex correction vector CV are expressed by the following equations (7).

$$DM = \begin{bmatrix} CM_{11} & CM_{12} & CM_{13} & CM_{14} \\ CM_{21} & CM_{22} & CM_{23} & CM_{24} \\ CM_{31} & CM_{32} & CM_{33} & CM_{34} \\ CM_{41} & CM_{42} & CM_{43} & CM_{44} \end{bmatrix}$$ (Equation 7)

$$CV = [CV_1 \quad CV_2 \quad CV_3 \quad CV_4]^T$$

When the above-described received response vector 210, or HD, is expressed by HD=[ha1, ha2, ha3, ha4]$^T$ and the virtual response vector is expressed by HU=[hb1, hb2, hb3, hb4]$^T$, each component of CM and CV is expressed by the following equations (8).

$$CM_{11} = ha^*_1 ha_1 + hb_1 \cdot hb_1 + \alpha$$

$$CM_{22} = ha^*_2 ha_2 + hb^*_2 hb_2 + \alpha$$

$$CM_{33} = ha^*_3 ha_3 + hb^*_3 hb_3 + \alpha$$

$$CM_{44} = ha^*_4 ha_4 + hb^*_4 hb_4 + \alpha$$

$$CM_{12} = ha^*_1 ha_2 + hb^*_1 hb_2$$

$$CM_{13} = ha^*_1 ha_3 + hb^*_1 hb_3$$

$$CM_{14} = ha^*_1 ha_4 + hb^*_1 hb_4$$

$$CM_{23} = ha^*_2 ha_3 + hb^*_2 hb_3$$

$$CM_{24} = ha^*_2 ha_4 + hb^*_2 hb_4$$

$$CM_{34} = ha^*_3 ha_4 + hb^*_3 hb_4$$

$$CM_{21} = CM^*_{12}$$

$$CM_{31} = CM^*_{13}$$

$$CM_{41} = CM^*_{14}$$

$$CM_{32} = CM^*_{23}$$

$$CM_{42} = CM^*_{24}$$

$$CM_{43} = CM^*_{34}$$

$$CV_1 = ha^*_1$$

$$CV_2 = ha^*_2$$

$$CV_3 = ha^*_3$$

$$CV_4 = ha^*_4$$ (Equation 8)

where α is a predetermined constant. The transmission weight vector 212 which is denoted by w is computed as follows from the complex correlation matrix CM and the complex correlation vector CV.

$$w = CM^{-1} CV \quad \text{(Equation 9)}$$

Each component of the transmission weight vector 212 (denoted by w) is expressed by the following equation (11) if the inverse matrix of the complex correlation matrix CM is expressed by the equation (10).

$$CM^{-1} = \begin{bmatrix} CMI_{11} & CMI_{12} & CMI_{13} & CMI_{14} \\ CMI_{21} & CMI_{22} & CMI_{23} & CMI_{24} \\ CMI_{31} & CMI_{32} & CMI_{33} & CMI_{34} \\ CMI_{41} & CMI_{42} & CMI_{43} & CMI_{44} \end{bmatrix} \quad \text{(Equation 10)}$$

$$w^*_1 = CMI_{11}CV_1 + CMI_{12}CV_2 + CMI_{13}CV_3 + CMI_{14}CV_4$$

$$w^*_2 = CMI_{21}CV_1 + CMI_{22}CV_2 + CMI_{23}CV_3 + CMI_{24}CV_4$$

$$w^*_3 = CMI_{31}CV_1 + CMI_{32}CV_2 + CMI_{33}CV_3 + CMI_{34}CV_4$$

$$w^*_4 = CMI_{41}CV_1 + CMI_{42}CV_2 + CMI_{43}CV_3 + CMI_{44}CV_4 \quad \text{(Equation 11)}$$

The multiplication unit 82 weights the transmission information signal 214 with the respective transmission weight vectors 212 so as to output the transmission digital signals 202. It is to be noted here that the timing in the above operations is assumed to be controlled by the signal processing control signal 216.

In terms of hardware, the above-described structure can be realized by a CPU, a memory and other LSIs of an arbitrary computer. In terms of software, it is realized by memory-loaded programs having reserve-manage functions or the like, but drawn and described here are function blocks that are realized in cooperation with those. Thus, it is understood by those skilled in the art that these functional blocks can be realized in a variety of forms by hardware only, software only or the combination thereof.

Figure 6A:
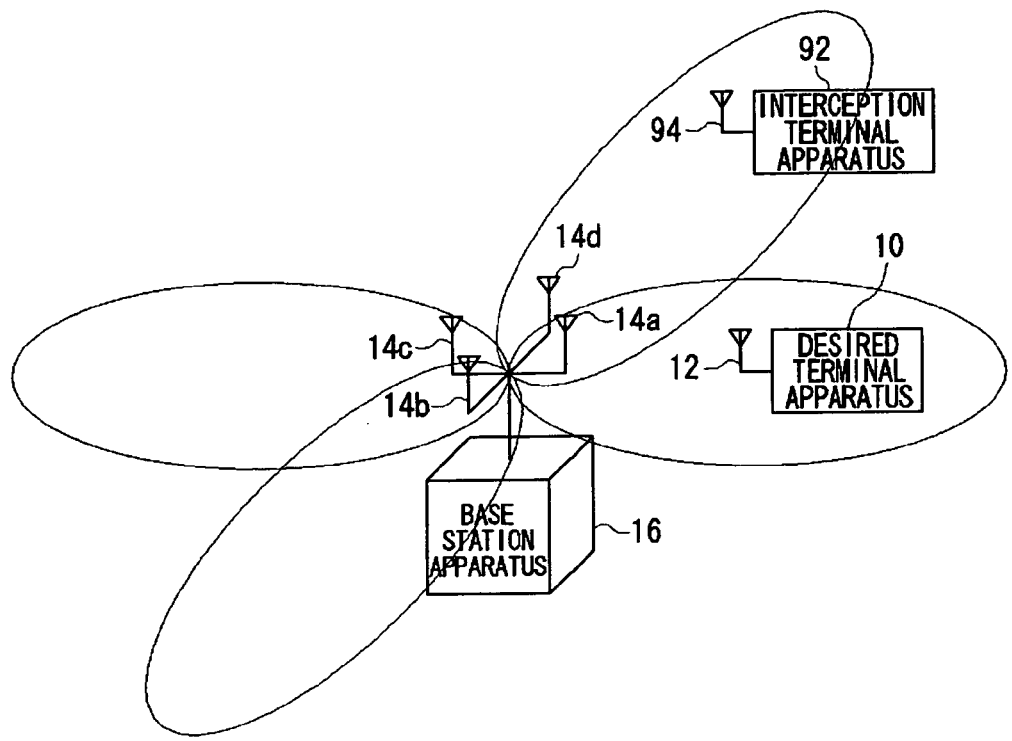
FIGS. 6A and 6B show directional patterns of antennas formed by a base station apparatus shown in FIG. 1.
Figure 6B:
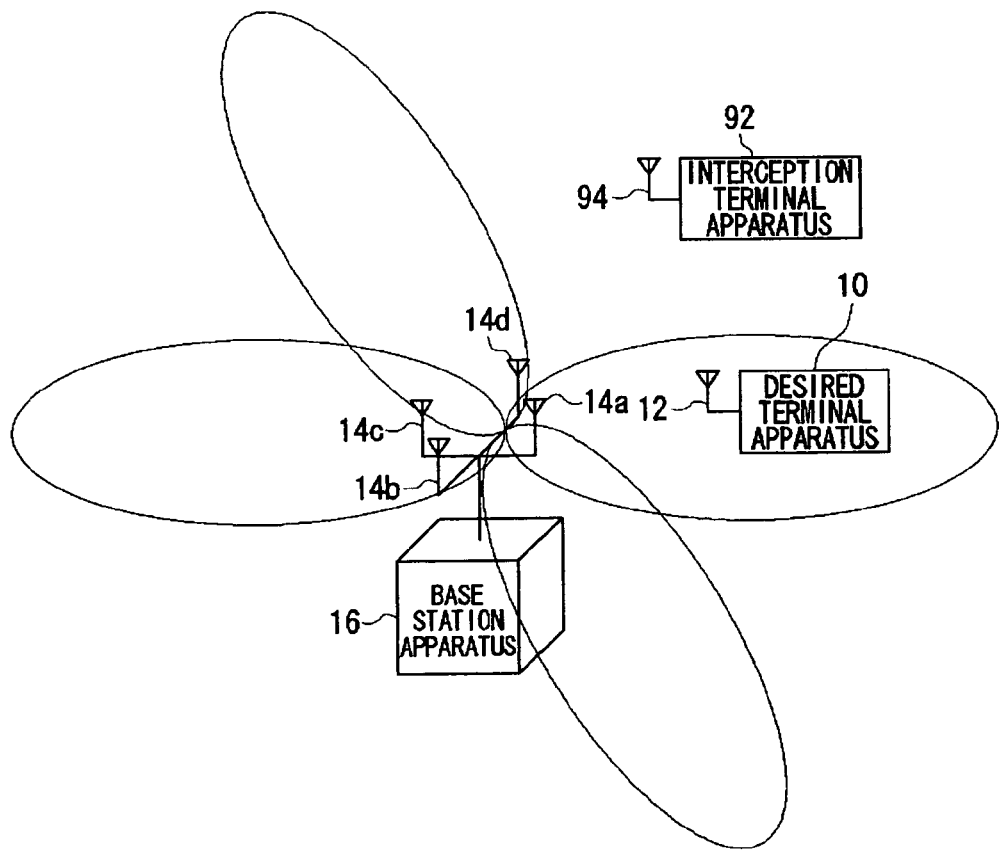

FIGS. 6A and 6B show directional patterns of antennas formed by the base station apparatus 16. Compared with FIG. 1, virtual interception terminal apparatuses 92 and antennas 94 for use with virtual interception terminal apparatus are additionally included therein, but they are not actually present but merely potentially or virtually created. FIG. 6A shows the directivity of antennas of the base station apparatus 16 in a case where the transmission weight vector 212 is generated from the received response vector 210 only. Antenna beams of the base station apparatus 16 formed and caused by the antenna 12 for use with terminal apparatus cover the desired terminal apparatus 10. At the same time, another beams of the base station apparatus 16 different from those facing in the direction of the desired terminal apparatus 10 cover the virtual interception terminal apparatus 92.

FIG. 6B shows the directivity of antennas 14 of the base station apparatus 16 in a case where the virtual response vector is taken into account in addition to the received response vector 210, that is, in the case when the transmission weight vector 212 is generated from both the received response vector 210 and the virtual response vector. Here, it is assumed that used is a virtual response vector where the antenna beams are not directed in the direction of the virtual interception terminal apparatus 92 when the transmission weight vector 212 is generated. As a result, the antenna beams of the base station apparatus 16 formed and caused by the antenna 12 for use with terminal apparatus cover the desired terminal apparatus 10 whereas another beams of the base station apparatus 16 different from those facing in the direction of the desired terminal apparatus 10 do not cover the virtual interception terminal apparatus 92. Since the base station apparatus 16 is generally not aware of directions in which the virtual interception terminal apparatus 92 is located, the base station apparatus 16 changes, at predetermined time intervals, the directional information contained in the virtual response vector so as to generate the transmission weight vector 212. That is, the directions of the antenna beams formed by the antenna 12 of the terminal apparatus 10 is changed with time. Thus, although the base station apparatus 16 has a predetermined probability of transmitting signals to the virtual interception terminal apparatus 92, this scheme according to the present embodiment makes it difficult to perform decoding at the virtual interception terminal apparatus 92 because the transmission of the signals is not continuous.

Figure 7:
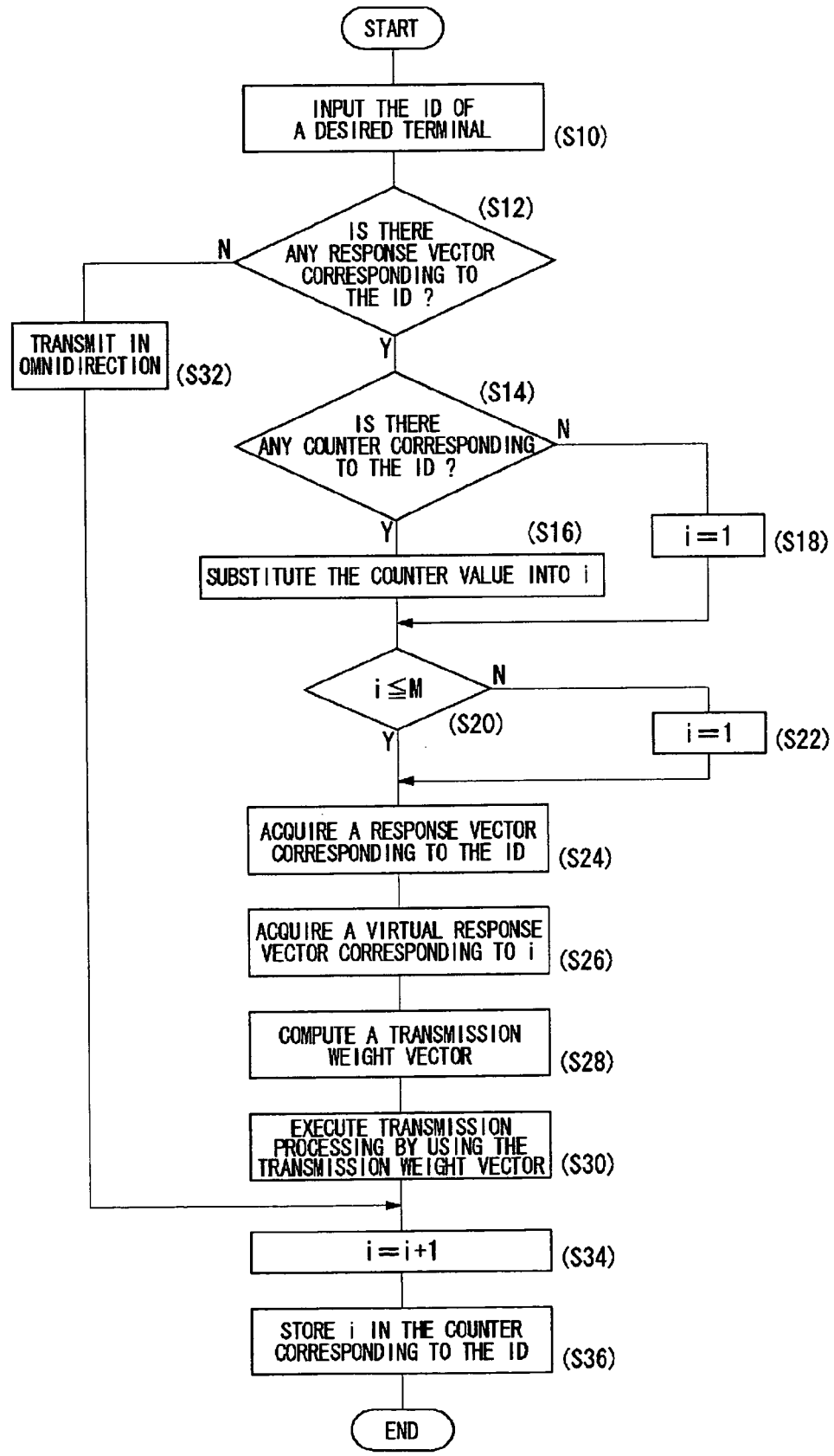
FIG. 7 is a flowchart showing a transmission processing carried out by the base station apparatus shown in FIG. 1.

FIG. 7 is a flowchart showing a transmission processing. When transmitting a burst, the control unit 26 inputs the ID of a desired terminal apparatus 10, which is a targeted party to the communication, to a response vector acquiring unit 84 by a signal processing control signal 216 (S10). If there is no received response vector 210 corresponding to the ID in a desired terminal response vector table 86 (N of S12), the transmission weight vector computing unit 80 determines the transmission weight vector 212 in such a manner that the directional patterns of antennas 14a to 14d of the base station apparatus become non-directional, so as to execute a transmission processing (S32). If there is a received response vector 210 corresponding to the ID in the desired terminal response vector table 86 (Y of S12), a check is made for the presence of a counter corresponding to the ID in the desired terminal transmission packet counter 88. If there is a counter corresponding to the ID (Y of S14), the counter value is substituted for i (S16), and if there is not (N of S14), 1 is substituted for i (S18). When i is no longer equal to or below the count of data M in the virtual interception terminal response vector table 90 (N of S20), i is restored to 1 (S22).

The response vector acquiring unit 84 acquires a received response vector 210 corresponding to the ID (S24) from the desired terminal response vector table 86. The response vector acquiring unit 84 further acquires a virtual response vector corresponding to "i" from the virtual intercepting terminal response vector table 90 (S26). The transmission weight vector computing unit 80 calculates a transmission weight vector 212 from the received response vector 210 and the virtual response weight vector 212 (S28). The multiplication unit 82 multiplies a transmission information signal 214 by the transmission weight vector 212, so as to execute a transmission processing (S30). The response vector acquiring unit 84 adds 1 to i (S34) and stores the sum in the counter corresponding to the ID in the desired terminal transmission packet counter 88 (S36).

An operation of the base station apparatus 16 structured as above will be described hereinbelow. In the receiving processing, signals from a desired terminal apparatus 10 are received by the antennas 14 of the base station apparatus 16, converted into received digital signals 200 by the radio unit 18 and then inputted to the signal processing unit 20. After the received weight vector computing unit 70 has calculated a received weight vector 204 from a received digital signal 200, each result of multiplication of the received digital signal 200 and the received weight vector 204 is added by an addition unit 76, and the sum is outputted as a synthesized signal 206 to the modem unit 22 and the baseband unit 24. On the other hand, the received digital signal 200 is also inputted to the response vector computing unit 72, where a received response vector 210 is computed. And the received response vector 210 is stored in the desired terminal response vector table 86.

In a transmission processing, a received response vector 210 is acquired from the desired terminal response vector table 86, and a virtual response vector is selected from the virtual intercepting terminal response vector table 90. The transmission weight vector computing unit 80 calculates transmission weight vectors 212 based on the received response vector 210 and virtual response vector. The multiplication unit 82 outputs the respective transmission digital signals 202, which are the results of multiplication of the transmission information signal 214 and the transmission weight vector 212. Then, after the transmission digital signal 202 is subjected to frequency translation at the radio unit 18, it is transmitted to the desired terminal apparatus 10 from the antenna 14 of the base station apparatus 16. When this is to be followed by a transmission of another burst to the desired terminal apparatus 10, the response vector acquiring unit 84 selects a virtual response vector, which is different from the already selected ones, from the virtual intercepting terminal response vector table 90, and carries out a same transmission processing as described above.

According to the first embodiment, calculated from the received response vector and the virtual response vector are the transmission weight vectors by which to form the directional patterns for antennas such that the signal strength in the direction of the desired terminal apparatus becomes large whereas the signal strength in the direction of the virtual interception terminal apparatus becomes small. Furthermore, the directional information on the virtual interception terminal apparatus contained in the virtual response vector is changed at predetermined time intervals, so that the probability of the transmitted signals being received by the unintended terminal apparatuses which are not targeted communication parties can be minimized. Moreover, since a plurality of virtual response vectors can be computed in advance and can therefore be stored in a recording medium, the processing amount therefor can be restrained.

Second Embodiment

A second embodiment, similarly to the first embodiment, relates to a base station apparatus which computes transmission weight vectors that can form a directional pattern of an antenna for increasing the signal strength in the direction of a desired terminal apparatus and decreasing it in the direction of a virtual interception terminal apparatus. Hypothetically, where there is closeness between the directions of a desired terminal apparatus and a supposed interception terminal apparatus, the signal strength in the direction of the desired terminal apparatus would become small in the directional pattern of the antenna. To avoid such circumstances, the base station apparatus according to the present embodiment calculates the transmission weight vector by changing the virtual response vector to a virtual response vector whose directional information on the virtual interception terminal apparatus differs when there is a large correlation value between the received response vector and the virtual response vector, that is, when there is a closeness between the directions of the desired terminal apparatus and virtual interception terminal apparatus. Thus the base station apparatus transmits signals to the desired terminal apparatus, using the transmission weight vectors calculated as described above.

Figure 8:
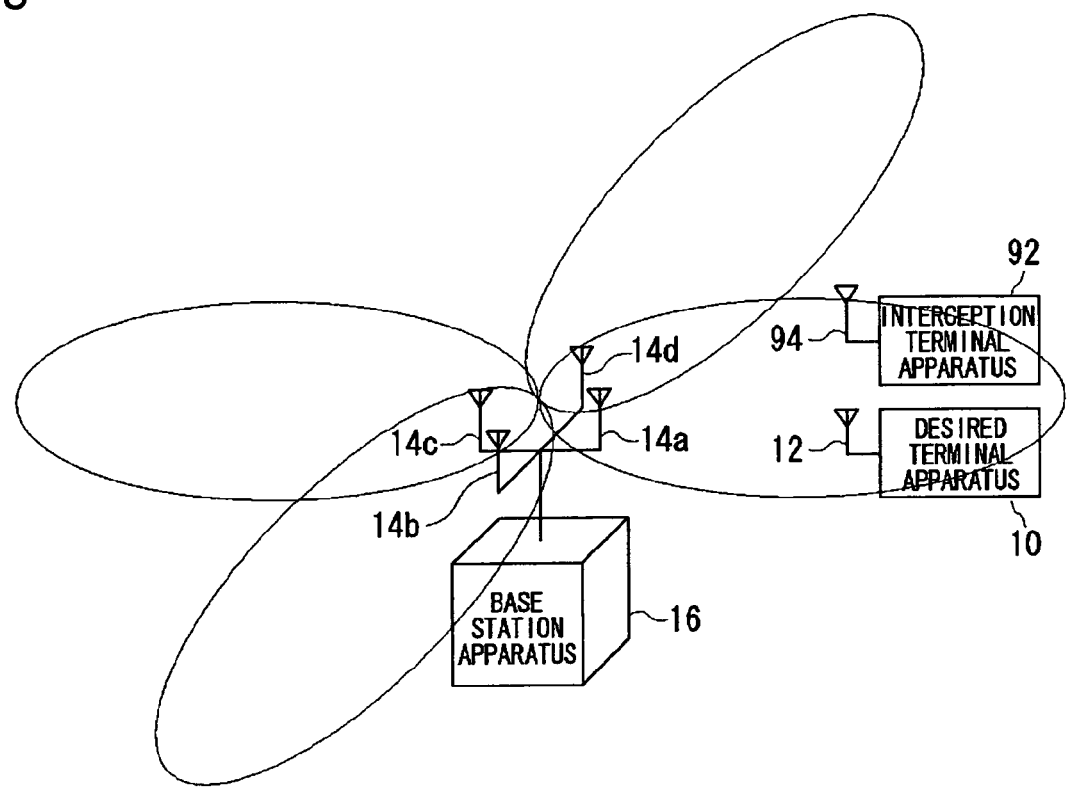
FIG. 8 shows a relative disposition of a desired terminal apparatus and a virtually intercepting terminal apparatus according to a second embodiment of the present invention.

FIG. 8 shows a relative disposition of a desired terminal apparatus 10 and a virtually intercepting terminal apparatus 92 according to the second embodiment. Since this virtual interception terminal apparatus 92 is a supposed existence, it is possible to assume as shown in FIG. 8 that it exists in the same direction as the desired terminal apparatus 10. In such a case, the base station apparatus 16 controls the transmission weight vector 212 in such a way as to reduce the signal strength in the direction of the desired terminal apparatus 10, which causes smaller received power at the desired terminal apparatus 10 and unstable as well as unreliable communication therewith.

The structure of a first signal processing unit 20a according to the second embodiment may be basically the same as one shown in FIG. 4, but here the function for computing the correlation value of received response vector 210 and virtual response vector is added to the response vector acquiring unit 84. In other words, the response vector acquiring unit 84 calculates the correlation value as follows:

$$C = \frac{|ha_1 hb_1 + ha_2 hb_2 + ha_3 hb_3 + ha_4 hb_4|}{|HD||HU|} \quad \text{(Equation 12)}$$

Figure 9:
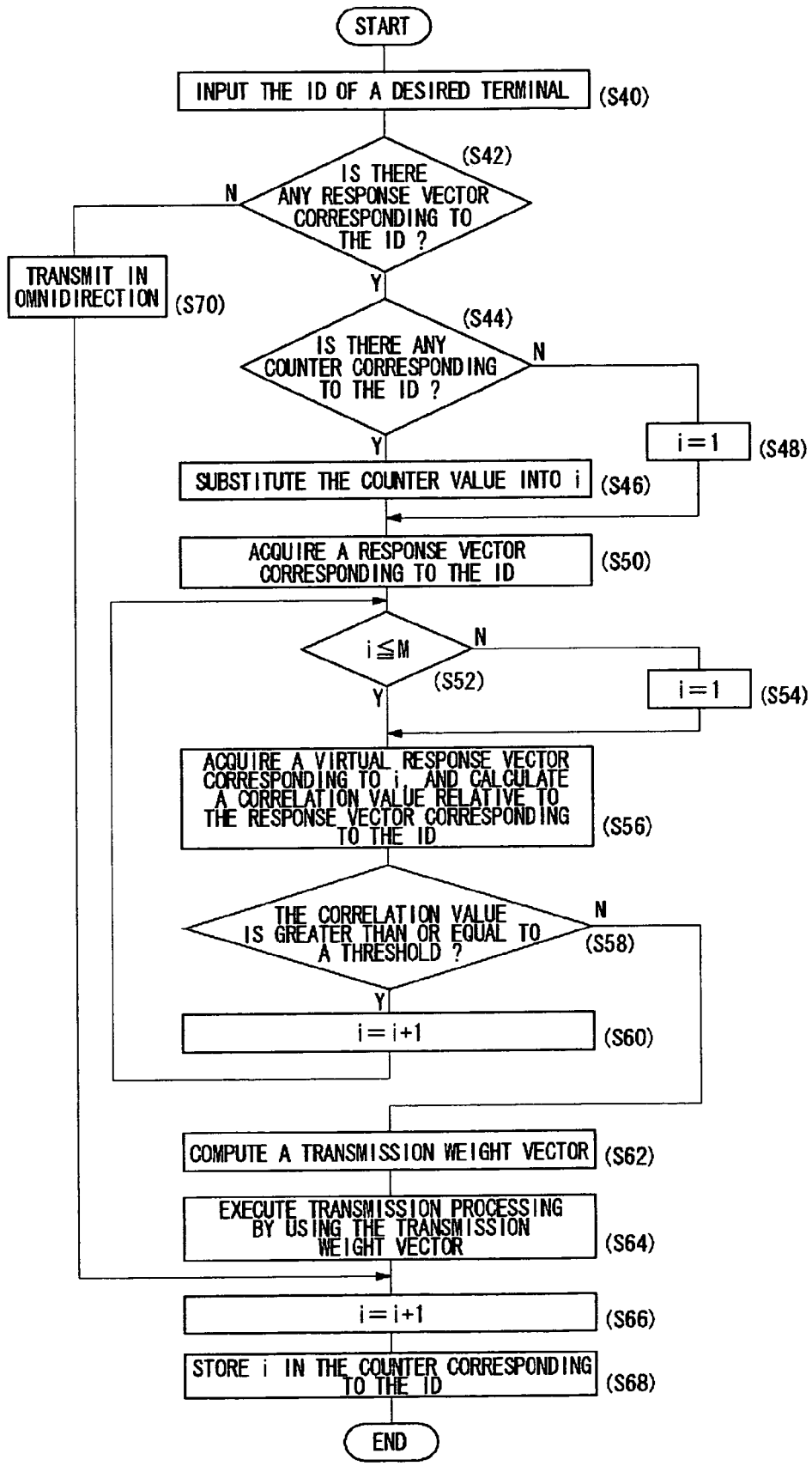
FIG. 9 is a flowchart showing a transmission processing carried out by a base station apparatus shown in FIG. 8.

FIG. 9 is a flowchart showing a transmission processing. When transmitting a burst, a control unit 26 inputs the ID of a desired terminal apparatus 10, which is a targeted party to the communication, to a response vector acquiring unit 84 by a signal processing control signal 216 (S40). If there is no received response vector 210 corresponding to the ID in a desired terminal response vector table 86 (N of S42), the transmission weight vector computing unit 80 determines the transmission weight vector 212 in such a manner that the directional patterns of antennas 14a to 14d of the base station apparatus become non-directional, so as to execute a transmission processing (S70). If there is a received response vector 210 corresponding to the ID in the desired terminal response vector table 86 (Y of S42), a check is made for the presence of a counter corresponding to the ID in the desired terminal transmission packet counter 88. If there is a counter corresponding to the ID (Y of S44), the counter value is substituted for i (S46), and if there is not (N of S44), 1 is substituted for i (S48). The response vector acquiring unit 84 acquires a received response vector 210 corresponding to the ID from the desired terminal response vector table 86 (S50). When i is no longer equal to or below the count of data M in the virtual interception terminal response vector table 90 (N of S52), i is restored to 1 (S54).

The response vector acquiring unit 84 acquires a virtual response vector corresponding to "i" from the virtual intercepting terminal response vector table 90 and calculates a correlation value relative to the received response vector 210 corresponding to the ID (S56). If the correlation value is greater than or equal to a threshold value (Y of S58), the response vector acquiring unit 84 adds 1 to i (S60) and acquires a virtual response vector again. On the other hand, if the correlation value is not greater than or equal to the threshold value (N of S58), the transmission weight vector computing unit 80 calculates a transmission weight vector 212 from the received response vector 210 and virtual response vector (S62). A multiplication unit 82 multiplies a transmission information signal 214 by the transmission weight vector 212, so as to execute a transmission processing (S64). The response vector acquiring unit 84 adds 1 to i (S66) and stores the sum in the counter corresponding to the ID in the desired terminal transmission packet counter 88 (S68).

An operation of the base station apparatus 16 structured as above will be described hereinbelow. In the receiving processing, signals from a desired terminal apparatus 10 are received by the antennas 14 of the base station apparatus 16, converted into received digital signals 200 by a radio unit 18 and then inputted to a signal processing unit 20. After the received weight vector computing unit 70 has calculated a received weight vector 204 from a received digital signal 200, each result of multiplication of the received digital signal 200 and the received weight vector 204 is added by an addition unit 76, and the sum is outputted as a synthesized signal 206 to a modem unit 22 and baseband unit 24. On the other hand, the received digital signal 200 is also inputted to a response vector computing unit 72, where a received response vector 210 is computed. And the received response vector 210 is stored in the desired terminal response vector table 86.

In a transmission processing, a received response vector 210 is acquired from the desired terminal response vector table 86, a virtual response vector is selected from the virtual intercepting terminal response vector table 90, and a correlation value thereof is calculated. When the correlation value is greater than or equal to a threshold value, another virtual response vector is selected from the virtual intercepting terminal response vector table 90. The transmission weight vector computing unit 80 calculates transmission weight vectors 212 based on the received response vector 210 and virtual response vector. The multiplication unit 82 outputs respective transmission digital signals 202, which are the results of multiplication of the transmission information signal 214 and the transmission weight vector 212. Then, after the transmission digital signal 202 is subjected to frequency translation at the radio unit 18, it is transmitted to the desired terminal apparatus 10 from the antennas 14 of the base station apparatus 16. When this is to be followed by a transmission of another burst to the desired terminal apparatus 10, the response vector acquiring unit 84 selects a virtual response vector, which is different from the already selected ones, from the virtual intercepting terminal response vector table 90, and carries out the same transmission processing as described above.

According to the second embodiment, in cases where there is closeness between the directions in which the desired terminal apparatus and the virtual interceptor terminal apparatus exist, the base station apparatus calculates the transmission weight vector by changing the virtual response vector to a virtual response vector with a different direction information, so that the signal strength in the direction of the desired terminal apparatus in the directional patterns of the antennas based on the transmission weight vectors can be prevented from becoming small.

Third Embodiment

A third embodiment, similarly to the second embodiment, relates to a processing by which to calculate transmission weight vectors in cases where there is closeness between the directions in which the desired terminal apparatus and the virtual interceptor terminal apparatus exist. In this third embodiment, a virtual response vector having direction information of the virtual interceptor terminal apparatus different from that of an already acquired virtual response vector is newly selected, as in the second embodiment, and the transmission power is also controlled. That is, the base station apparatus estimates the power to be received by the desired terminal apparatus from the correlation value of the received response vector and virtual response vector, and, if the estimated power to be received is small, controls the transmission power to become larger. Furthermore, if the estimated power is large, the base station apparatus will control the transmission power to be even small.

Figure 10:
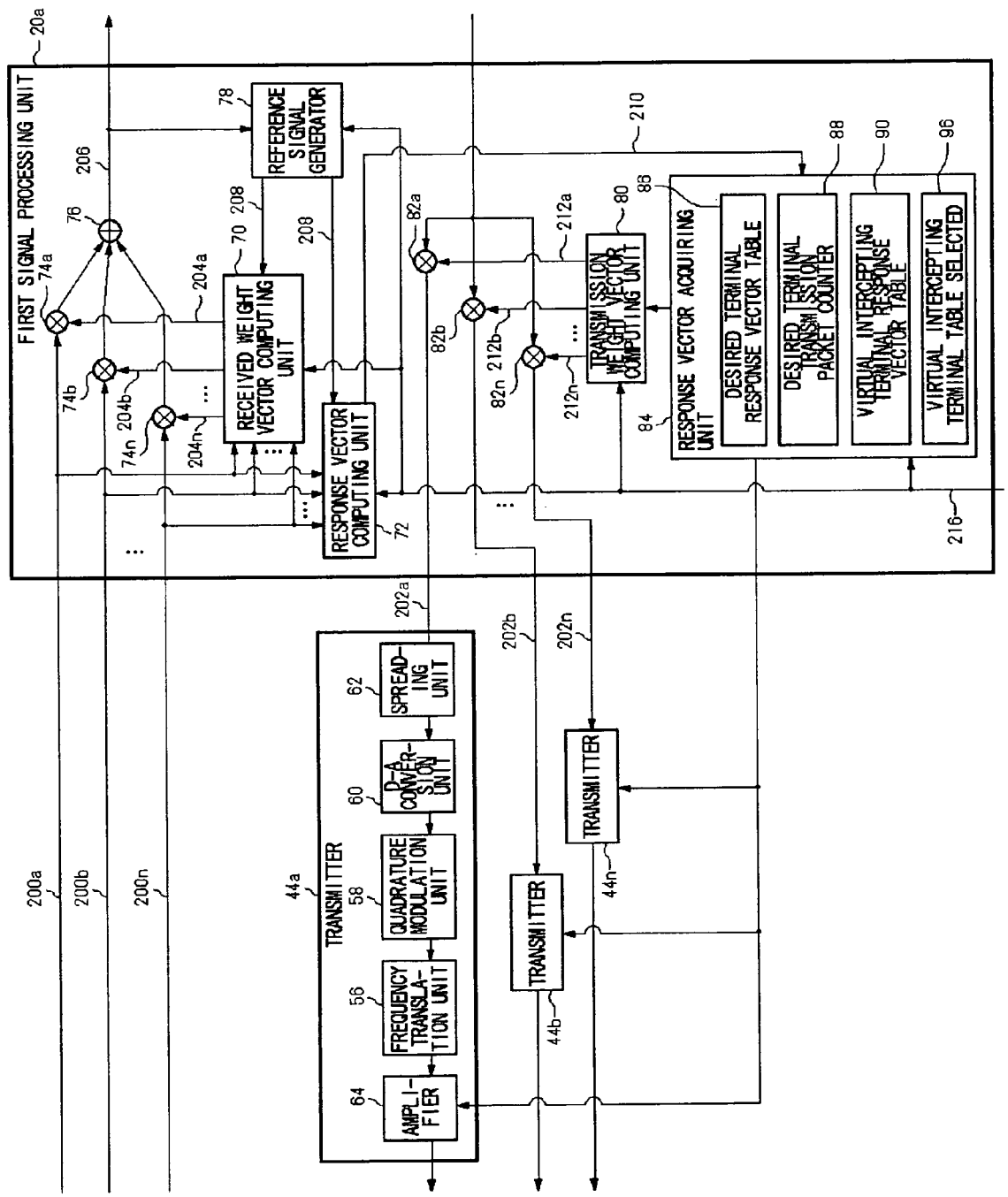
FIG. 10 shows a structure of transmitters and first signal processing unit according to a third embodiment of the present invention.

FIG. 10 shows a structure of transmitters 44 and a first signal processing unit 20a according to the third embodiment. The first signal processing unit 20a shown in FIG. 10 has a different structure of the response vector acquiring unit 84 from the first signal processing unit 20a of FIG. 4, and it includes a selected virtual intercepting terminal table 96 in addition to a desired terminal response vector table 86, a desired terminal transmission packet counter 88 and a virtual intercepting terminal response vector table 90 similar to those in FIG. 10. Moreover, similarly to the second embodiment, the response vector acquiring unit 84 calculates the correlation values of the received response vector 210 and virtual response vector. A first transmitter 44, a second transmitter 44b and an Nth transmitter 44n are each generally referred to as a transmitter 44.

The response vector acquiring unit 84 calculates the correlation value of a received response vector 210 and a virtual response vector and stores said virtual response vector in the selected virtual intercepting terminal table 96 if the correlation value is smaller than a threshold value. The inner product of a transmission weight vector 212, which is calculated from a received response vector 210 and a virtual response vector, and the received response vector 210 is computed as follows:

$$P1 = |ha_1 w^*_1 + ha_2 w^*_2 + ha_3 w^*_3 + ha_4 w^*_4| \quad \text{(Equation 13)}$$

Further, the product P2 of P1 and TXP is calculated as follows:

$$P2 = TXP * P1 \quad \text{(Equation 14)}$$

TXP is determined such that the value of P2 becomes nearly constant, and it is outputted as a TPX signal 220 to the transmitter 44.

FIG. 11 shows a data structure of a selected virtual intercepting terminal table. In the same manner as with the virtual intercepting terminal response vector table shown in FIG. 5, the respective elements of virtual response vectors are stored in it. However, the data numbers are not continuous because the data are those of selected virtual response vectors. The TXPs for setting the value of transmission power are also stored in the table.

Figure 12:
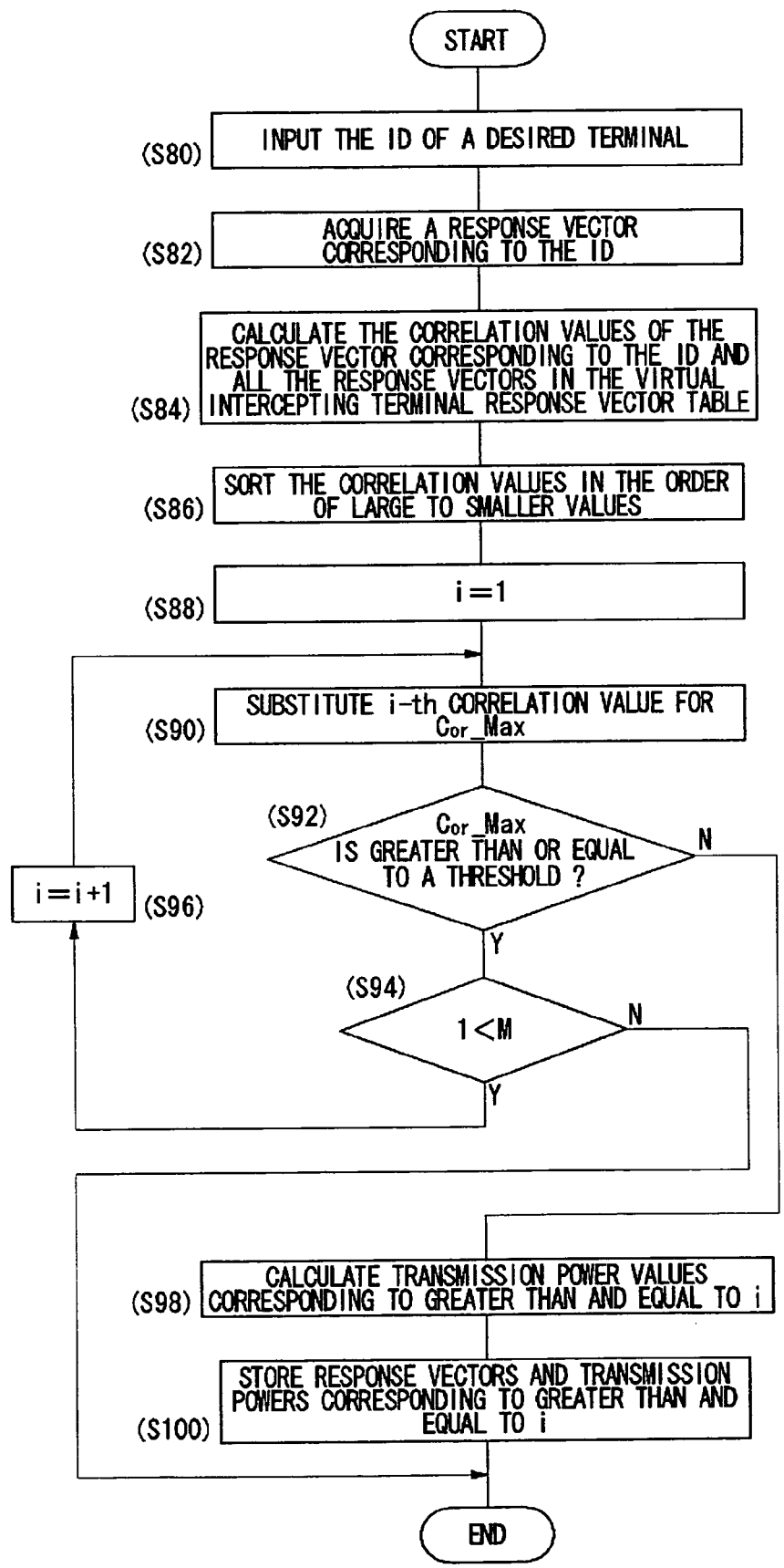
FIG. 12 is a flowchart showing a processing for generating a virtual intercepting terminal table shown in FIG. 10.

FIG. 12 is a flowchart showing a processing for generating a virtual intercepting terminal table. A control unit 26 inputs the ID of a desired terminal apparatus 10, which is a targeted party to the communication, to the response vector acquiring unit 84 by a signal processing control signal 216 (S80). The response vector acquiring unit 84 acquires a received response vector 210 corresponding to the ID from the desired terminal response vector table 86 (S82). The response vector acquiring unit 84 calculates the correlation values of the received response vector 210 corresponding to the ID and all the virtual response vectors in the virtual intercepting terminal response vector table 90 (S84). The correlation values are sorted in the order of larger to smaller values (S86). 1 is set for i (S88), and the ith correlation value is substituted for the variable Cor_Max (S90).

If the Cor_Max is greater than or equal to a threshold value (Y of S92) and if i is smaller than M (Y of S94), 1 is added to i (S96) and the above processing is carried out repeatedly. On the other hand, if the Cor_Max is not greater than or equal to the threshold value (N of S92), the inner products P1 of the virtual response vectors corresponding to the ith to Mth correlation values and the received response vector are respectively calculated, and consequently the TXPs which are transmission power values are calculated (S98). A correspondence table of correlation values and TXPs may be prepared beforehand and a transmission power value may be acquired directly from a correlation value. FIG. 13 shows a data structure of a correlation table of correlation values and transmission powers that can be used for calculating the transmission power. The response vector acquiring unit 84 stores the virtual response vectors and the TXPs corresponding to the ith to Mth correlation values in the selected virtual intercepting terminal table 96 (S100).

Figure 14:
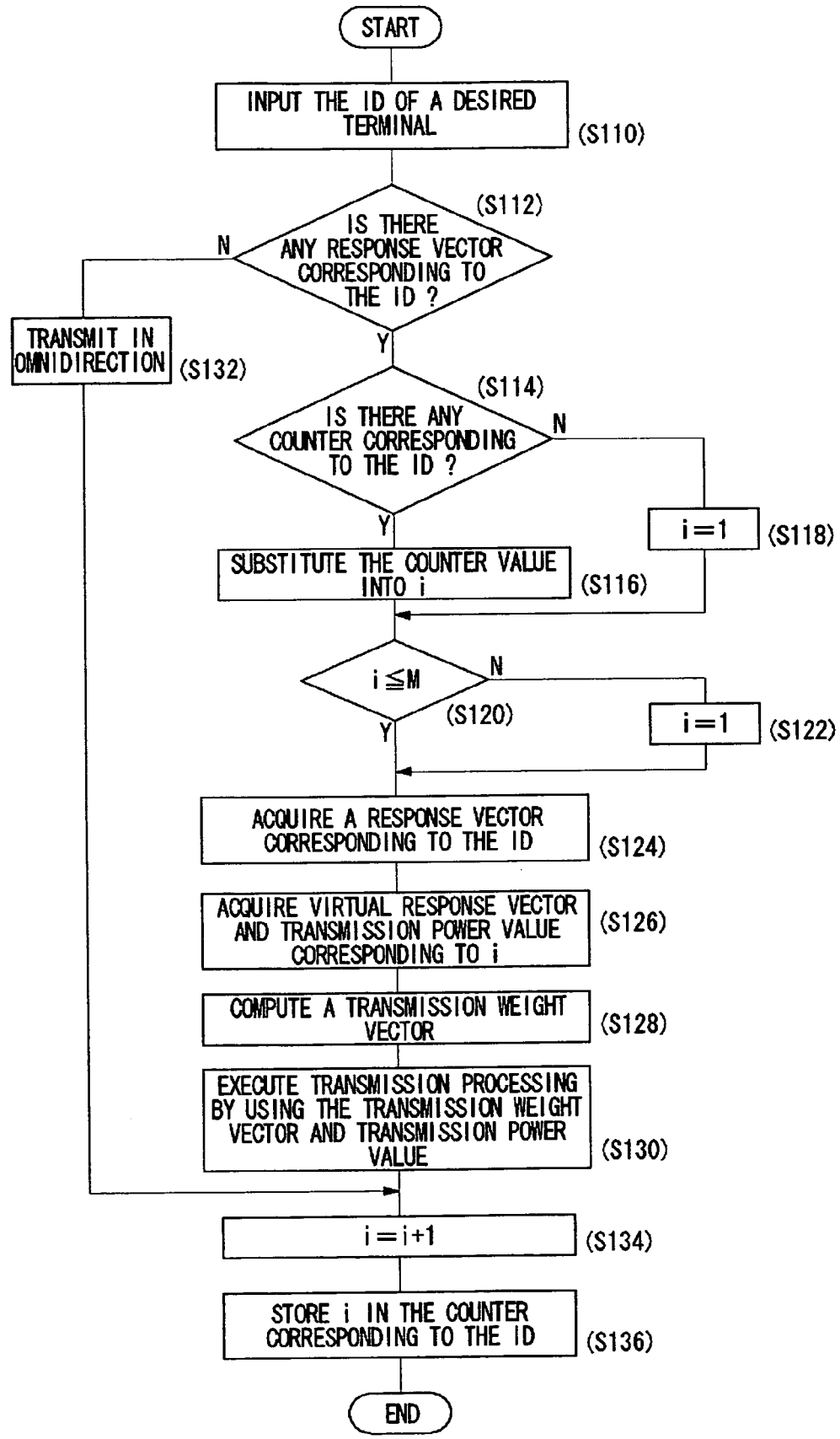
FIG. 14 is a flowchart showing a transmission processing carried out by a base station apparatus according to a third embodiment of the present invention.

FIG. 14 is a flowchart showing a transmission processing carried out by the base station apparatus according to the third embodiment. When transmitting a burst, the control unit 26 inputs the ID of a desired terminal apparatus 10, which is a targeted party to the communication, to the response vector acquiring unit 84 by a signal processing control signal 216 (S110). If there is no received response vector 210 corresponding to the ID in the desired terminal response vector table 86 (N of 112), the transmission weight vector computing unit 80 determines the transmission weight vector 212 in such a manner that the directional pattern of the antennas 14a to 14d of the base station apparatus 16 becomes non-directional, so as to execute a transmission processing (S132). If there is a received response vector 210 corresponding to the ID in the desired terminal response vector table 86 (Y of S112), a check is made for the presence of a counter corresponding to the ID in the desired terminal transmission packet counter 88. If there is a counter corresponding to the ID (Y of S114), the counter value is substituted for i (S116), and if there is not (N of S114), 1 is substituted for i (S118). And when i is no longer equal to or below the count of data M in the virtual intercepting terminal response vector table 90 (N of 120), i is restored to 1 (S122).

The response vector acquiring unit 84 acquires a received response vector 210 corresponding to the ID from the desired terminal response vector table 86 (S124). Moreover, the response vector acquiring unit 84 acquires virtual response vector and TXP corresponding to "i" from the selected virtual intercepting terminal table 96 (S126). The TXP is outputted as a TXP signal 220 to the transmitter 44. The transmission weight vector computing unit 80 calculates a transmission weight vector 212 from the received response vector 210 and the virtual response vector (S128). It is to be noted here that the value, if there is any already calculated, may be used. The multiplication unit 82 multiplies a transmission information signal 214 by the transmission weight vector 212 and carries out a transmission processing, with the transmitter 44 further using the TXP signal 220 (S130). The response vector acquiring unit 84 adds 1 to i (S134) and stores the sum in the counter corresponding to the ID in the desired terminal transmission packet counter 88 (S136).

An operation of the base station apparatus 16 structured as above will be described hereinbelow. In a receiving processing, signals from a desired terminal apparatus 10 are received by the antennas 14 of the base station apparatus, converted into received digital signals 200 by the radio unit 18 and then inputted to the signal processing unit 20. After the received weight vector computing unit 70 has calculated the received weight vector 204 from the received digital signal 200, each result of multiplication of the received digital signal 200 and the received weight vector 204 is added by an addition unit 76, and the sum is outputted as a synthesized signal 206 to a modem unit 22 and a baseband unit 24. On the other hand, the received digital signal 200 is also inputted to the response vector computing unit 72, where a received response vector 210 is computed. And the received response vector 210 is stored in the desired terminal response vector table 86. Prior to a transmission processing, the response vector acquiring unit 84 calculates the correlation values of the received response vector 210 and the virtual response vectors stored in the virtual intercepting terminal response vector table 90 and stores the virtual response vectors corresponding to the correlation values smaller than the threshold value in the selected virtual intercepting terminal table 96. At this time, the transmission power values TXPs are also acquired and stored in the selected virtual intercepting terminal table 96.

In a transmission processing, a received response vector 210 is acquired from the desired terminal response vector table 86, a virtual response vector and TXP are selected from the selected virtual intercepting terminal table 96, and a transmission weight vector 212 is calculated by the transmission weight vector computing unit 89 based on the received response vector 210 and the virtual response vector. The selected TXP is outputted as a TXP signal 220 to the radio unit 18. The multiplication unit 82 outputs transmission digital signals 202, which are the results of multiplication of the transmission information signals 214 and the transmission weight vector 212. Then, after the signals are subjected to frequency translation and control of the transmission power value by the TXP signal 220 at the radio unit 18, they are transmitted to the desired terminal apparatus 10 from the antennas 14 of the base station apparatus 16. When this is to be followed by a transmission of another burst to the desired terminal apparatus 10, the response vector acquiring unit 84 selects a virtual response vector, which is different from the already selected ones, from the selected virtual intercepting terminal table 96, and carries out the same transmission processing as described above.

According to the third embodiment, in cases where there is closeness between the directions in which the desired terminal apparatus and the virtual interception terminal apparatus exist, the base station apparatus not only changes the virtual response vector to a virtual response vector with a different direction information on the virtual interception terminal apparatus but also estimates the power to be received by the desired terminal apparatus and controls the transmission power such that the estimated received power becomes nearly constant. As a result, the signal strength in the direction of the desired terminal apparatus in the directional patterns of the antennas based on the transmission weight vectors can be prevented from becoming small. Moreover, since the desired terminal apparatus can receive signals at nearly constant power, the design of AGC at the desired terminal apparatus becomes easier.

The present invention has been described based on the embodiments which are only exemplary. It is understood by those skilled in the art that there exist other various modifications to the combination of each component and process described above and that such modifications are encompassed by the scope of the present invention.

In the first to third embodiments, the base station apparatus 16 is applied to a communication system 100 based on CSMA. However, the base station apparatus 16 may be applied to other communication systems such as TDMA (Time Division Multiple Access) and CDMA (Code Division Multiple Access) systems. When it is applied to a TDMA system, the transmission timing of signals is controlled by the control unit 26, so that the system may be constituted without the desired terminal transmission packet counter 88. In such modified examples, the present invention can be applied to a great variety of communication systems. That is, it can be applied so long as the base station apparatus 16 is one that transmits signals to the desired terminal apparatus 10.

In the first to third embodiments, the response vector computing unit 72 calculates received response vectors 210 by assuming the presence of interfering terminal apparatuses. However, the response vector computing unit 72 may calculate received response vectors 210 only by the correlation processing of the received digital signals 200 and the reference signal 208 without assuming the presence of interfering terminal apparatuses. In this modified example, the circuit may be made smaller in scale. That is, such a modification works so long as the received response vectors 210 are calculated with a sufficient accuracy for a given situation.

In the first to third embodiments, the response vector acquiring unit 84 selects a virtual response vector from the virtual intercepting terminal response vector table 90 for each burst. However, the present embodiments are limited thereto, and, for example, a new virtual response vector may also be selected automatically for every predetermined period or so forth. That is, such a modification is advantageous so long as the directional pattern of the antenna to be formed by the transmission weight vector 212 is changed and varied.

In the first to third embodiments, the signal processing unit 20 is applied to a base station apparatus 16. However, the present embodiments are not limited thereto and, for example, the signal processing unit may also be applied to a desired terminal apparatus 10.

In the first embodiment, the received weight vector computing unit 70 uses an adaptive algorithm in estimating the received weight vector 204, and the response vector computing unit 72 uses a processing based on correlation computation in estimating the received response vector 210. However, a processing different therefrom may be performed at the received weight vector computing unit 70 and the response vector computing unit 72. For example, only one of the processings based on the adaptive algorithm or the correlation computation may be carried out at the received weight vector computing unit 70 and the response vector computing unit 72. In such a case, the received weight vector computing unit 70 and the response vector computing unit 72 may be integrally structured. Moreover, arrival direction estimation using algorithms, such as MUSIC (MUltiple SIgnal Classification), different from the adaptive algorithm or correlation processing may be carried out at the received weight vector computing unit 70 or the response vector computing unit 72. In this modification, the desired waves and interference waves are distinguished with greater accuracy. Such modifications are to be permitted so long as the performance of the adaptive array antenna in the signal processing improves.

Although the present invention has been described by way of exemplary embodiments, it should be understood that many changes and substitutions may further be made by those skilled in the art without departing from the scope of the present invention which is defined by the appended claims.

What is claimed is:

1. A radio apparatus, including:
a computing unit which computes a received response vector of a terminal apparatus which is a targeted communication party, based on signals received from the targeted terminal apparatus, the received response vector indicating a received response characteristic of a received signal from the terminal apparatus against a transmission signal;
an acquiring unit which acquires one of virtual response vectors with respect to corresponding one of a plurality of virtual terminal apparatuses assumed such that directions in which the plurality of virtual terminal apparatuses exist are mutually different from each other, the virtual response vectors being stored in advance;
a generator which generates a transmission weight vector based on the received response vector computed by said computing unit and the one of the virtual response vectors acquired by said acquiring unit, the received response vector and the virtual response vectors being used to form the transmission weight vector indicting an antenna's directional pattern such that a signal strength in a direction to the terminal apparatus becomes greater whereas a signal strength in a direction to one of the virtual terminal apparatuses becomes smaller; and
a transmitter which transmits a predetermined signal to the targeted terminal apparatus based on the transmission weight vector generated by said generator, wherein
said acquiring unit acquires again another virtual response vector such that one of the direction in which the one of the virtual terminal apparatus exists is changed to another direction, and the thus reacquired virtual response vector is again subject to processes by said generator and said transmitter, and
said acquiring unit reacquires another virtual response vector whose value of correlation with the received response vector computed by said computing unit is less than or equal to a predetermined threshold value, and the thus reacquired virtual response vector is again subject to the processes by said generator and said transmitter,
the radio apparatus further including:
a measuring unit which measures the intensity of a signal received from the targeted terminal apparatus; and
an intensity determining unit which instructs said acquiring unit to switch to the virtual response vector whose value of correlation with the received response vector computed by said computing unit becomes less than or equal to a predetermined threshold value if a signal strength value of the targeted terminal apparatus, which is calculated from the transmission weight vector, the received response vector and information on the intensity of the received signal measured by said measuring unit, is less than or equal to a threshold value.

2. A radio apparatus according to claim 1, wherein said acquiring unit further includes:
a storage which stores the virtual response vectors whose values of mutual correlation therewith are less than or equal to a predetermined threshold value; and
a selector which selects a virtual response vector from the virtual response vectors stored in said storage.

3. A radio apparatus, including:
a computing unit which computes a received response vector of a terminal apparatus which is a targeted communication party, based on signals received from the targeted terminal apparatus, the received response vector indicating a received response characteristic of a received signal from the terminal apparatus against a transmission signal;
an acquiring unit which acquires one of virtual response vectors with respect to corresponding one of a plurality of virtual terminal apparatuses assumed such that directions in which the plurality of virtual terminal apparatuses exist are mutually different from each other, the virtual response vectors being stored in advance;
a generator which generates a transmission weight vector based on the received response vector computed by said computing unit and the one of the virtual response vectors acquired by said acquiring unit, the received response vector and the virtual response vectors being used to form the transmission weight vector indicting an antenna's directional pattern such that a signal strength in a direction to the terminal apparatus becomes greater whereas a signal strength in a direction to one of the virtual terminal apparatuses becomes smaller; and
a transmitter which transmits a predetermined signal to the targeted terminal apparatus based on the transmission weight vector generated by said generator, wherein said acquiring unit acquires again another virtual response vector such that one of the direction in which the one of the virtual terminal apparatus exists is changed to another direction, and the thus reacquired virtual response vector is again subject to processes by said generator and said transmitter, and said acquiring unit reacquires another virtual response vector whose value of correlation with the received response vector computed by said computing unit is less than or equal to a predetermined threshold value, and the thus reacquired virtual response vector is again subject to the processes by said generator and said transmitter, the radio apparatus further including:

a measuring unit which measures the intensity of a signal received from the targeted terminal apparatus; and an intensity determining unit which instructs said transmitter to increase the intensity of signals to be transmitted to the targeted terminal apparatus if a signal strength value of the targeted terminal apparatus, which is calculated from the transmission weight vector, the received response vector and information on the intensity of the received signal measured by said measuring unit, is less than or equal to a threshold value.

4. A radio apparatus according to claim 1, wherein said intensity determining unit estimates the signal strength value of the targeted terminal apparatus from a value of correlation between the received response vector and the one of the virtual response vectors.

5. A transmission method, including:

computing a received response vector of a terminal apparatus which is a targeted communication party, based on signals received from the targeted terminal apparatus, the received response vector indicating a received response characteristic of a received signal from the terminal apparatus against a transmission signal;

acquiring one of virtual response vectors with respect to corresponding one of a plurality of virtual terminal apparatuses different from the terminal apparatus which is a targeted communication party and assumed such that directions in which the plurality of virtual terminal apparatuses exist are mutually different from each other, the virtual response vectors being stored in advance;

generating a transmission weight vector based on the received response vector computed in said computing and the virtual response vector acquired in said acquiring, the received response vector and the virtual response vectors being used to form the transmission weight vector indicting an antenna's directional pattern such that a signal strength in a direction to the terminal apparatus becomes greater whereas a signal strength in a direction to one of the virtual terminal apparatuses becomes smaller; and transmitting a predetermined signal to the targeted terminal apparatus based on the transmission weight vector generated by said generating, wherein said acquiring one of the virtual response vectors is such that another virtual response vector is acquired again so as to change from the direction in which the one of virtual terminal apparatuses exists to another direction in which another virtual terminal apparatus exists, and the thus reacquired virtual response vector is again subject to processes by said generating a transmission weight vector and said transmitting a predetermined signal, and said acquiring one of the virtual response vectors is such that a virtual response vector whose value of correlation with the received response vector computed by said computing is less than or equal to a predetermined threshold value is reacquired, and the thus reacquired virtual response vector is again subject to the processes by said generating a transmission weight vector and said transmitting a predetermined signal, the transmission method further including:

measuring the intensity of a signal received from the targeted terminal apparatus; and instructing said acquiring one of the virtual response vectors to switch to a virtual response vector whose value of correlation with the received response vector computed by said computing becomes less than or equal to a predetermined threshold value if a signal strength value of the targeted terminal apparatus, which is calculated from the transmission weight vector, the received response vector and information on the intensity of the received signal measured by said measuring unit, is less than or equal to a threshold value.

6. A transmission method according to claim 5, wherein said acquiring one of the virtual response vectors further includes:

referring to a table storing the virtual response vectors whose values of mutual correlation therewith are less than or equal to a predetermined threshold value and selecting a virtual response vector from the virtual response vectors.

7. A transmission method, including:

computing a received response vector of a terminal apparatus which is a targeted communication party, based on signals received from the targeted terminal apparatus, the received response vector indicating a received response characteristic of a received signal from the terminal apparatus against a transmission signal;

acquiring one of virtual response vectors with respect to corresponding one of a plurality of virtual terminal apparatuses different from the terminal apparatus which is a targeted communication party and assumed such that directions in which the plurality of virtual terminal apparatuses exist are mutually different from each other, the virtual response vectors being stored in advance;

generating a transmission weight vector based on the received response vector computed in said computing and the virtual response vector acquired in said acquiring, the received response vector and the virtual response vectors being used to form the transmission weight vector indicting an antenna's directional pattern such that a signal strength in a direction to the terminal apparatus becomes greater whereas a signal strength in a direction to one of the virtual terminal apparatuses becomes smaller; and transmitting a predetermined signal to the targeted terminal apparatus based on the transmission weight vector generated by said generating, wherein said acquiring one of the virtual response vectors is such that another virtual response vector is acquired again so as to change from the direction in which the one of virtual terminal apparatuses exists to another direction in which another virtual terminal apparatus exists, and the thus reacquired virtual response vector is again subject to processes by said generating a transmission weight vector and said transmitting a predetermined signal, and said acquiring one of the virtual response vectors is such that a virtual response vector whose value of correlation with the received response vector computed by said computing is less than or equal to a predetermined threshold value is reacquired, and the thus reacquired virtual response vector is again subject to the processes by said generating a transmission weight vector and said transmitting a predetermined signal, the transmission method further including:

measuring the intensity of a signal received from the targeted terminal apparatus; and instructing said transmitting a predetermined signal to increase the intensity of signals to be transmitted to the targeted terminal apparatus if a signal strength value of the targeted terminal apparatus, which is calculated from the transmission weight vector, the received response vector and information on the intensity of the received signal measured by said measuring unit, is less than or equal to a threshold value.

8. A transmission method according to claim 5, wherein said instructing to switch to a virtual response vector is such that the signal strength value of the targeted terminal apparatus is estimated from a value of correlation between the received response vector and the virtual response vector.

9. A transmission method according to claim 7, wherein said instructing to increase the intensity of signals is such that the signal strength value of the targeted terminal apparatus is estimated from a value of correlation between the received response vector and the one of the virtual response vectors.

10. A computer readable storage medium encoded with a program executable by a computer, the program including the functions of:

computing a received response vector of a terminal apparatus which is a targeted communication party, based on signals received from the targeted terminal apparatus, the received response vector indicating a received response characteristic of a received signal from the terminal apparatus against a transmission signal;

acquiring one of virtual response vectors with respect to corresponding one of a plurality of virtual terminal apparatuses different from the terminal apparatus which is a targeted communication party and assumed such that directions in which the plurality of virtual terminal apparatuses exist are mutually different from each other, the virtual response vectors being stored in advance;

generating a transmission weight vector based on the received response vector computed in said computing and the virtual response vector acquired in said acquiring, the received response vector and the virtual response vectors being used to form the transmission weight vector indicting an antenna's directional pattern such that a signal strength in a direction to the terminal apparatus becomes greater whereas a signal strength in a direction to one of the virtual terminal apparatuses becomes smaller; and transmitting a predetermined signal to the targeted terminal apparatus based on the transmission weight vector generated by said generating, wherein said acquiring one of the virtual response vectors is such that another virtual response vector whose value of correlation with the received response vector computed by said computing is acquired again so as to change from the direction in which the one of virtual terminal apparatuses exists to another direction in which another virtual terminal apparatus exists, and the thus reacquired virtual response vector is again subject to processes by said generating a transmission weight vector and said transmitting a predetermined signal, and said acquiring one of the virtual response vectors is such that a virtual response vector whose value of correlation with the received response vector computed by said computing is less than or equal to a predetermined threshold value is reacquired, and the thus reacquired virtual response vector is again subject to the processes by said generating a transmission weight vector and said transmitting a predetermined signal, the computer readable storage medium further including:

measuring the intensity of a signal received from the targeted terminal apparatus; and instructing said acquiring one of the virtual response vectors to switch to a virtual response vector whose value of correlation with the received response vector computed by said computing becomes less than or equal to a predetermined threshold value if a signal strength value of the targeted terminal apparatus, which is calculated from the transmission weight vector, the received response vector and information on the intensity of the received signal measured by said measuring unit, is less than or equal to a threshold value.

11. A computer readable storage medium according to claim 10, wherein said acquiring one of the virtual response vectors further includes:

referring to a table storing the virtual response vectors whose values of mutual correlation therewith are less than or equal to a predetermined threshold value and selecting a virtual response vector from the virtual response vectors.

12. A computer readable storage medium encoded with a program executable by a computer, the program including the functions of:

computing a received response vector of a terminal apparatus which is a targeted communication party, based on signals received from the targeted terminal apparatus, the received response vector indicating a received response characteristic of a received signal from the terminal apparatus against a transmission signal;

acquiring one of virtual response vectors with respect to corresponding one of a plurality of virtual terminal apparatuses different from the terminal apparatus which is a targeted communication party and assumed such that directions in which the plurality of virtual terminal apparatuses exist are mutually different from each other, the virtual response vectors being stored in advance;

generating a transmission weight vector based on the received response vector computed in said computing and the virtual response vector acquired in said acquiring, the received response vector and the virtual response vectors being used to form the transmission weight vector indicting an antenna's directional pattern such that a signal strength in a direction to the terminal apparatus becomes greater whereas a signal strength in a direction to one of the virtual terminal apparatuses becomes smaller; and transmitting a predetermined signal to the targeted terminal apparatus based on the transmission weight vector generated by said generating, wherein said acquiring one of the virtual response vectors is such that another virtual response vector whose value of correlation with the received response vector computed by said computing is acquired again so as to change from the direction in which the one of virtual terminal apparatuses exists to another direction in which another virtual terminal apparatus exists, and the thus reacquired virtual response vector is again subject to processes by said generating a transmission weight vector and said transmitting a predetermined signal, and said acquiring one of the virtual response vectors is such that a virtual response vector whose value of correlation with the received response vector computed by said computing is less than or equal to a predetermined threshold value is reacquired, and the thus reacquired virtual response vector is again subject to the processes by said generating a transmission weight vector and said transmitting a predetermined signal, the computer readable storage medium further including:

measuring the intensity of a signal received from the targeted terminal apparatus; and instructing said transmitting a predetermined signal to increase the intensity of signals to be transmitted to the targeted terminal apparatus if a signal strength value of the targeted terminal apparatus, which is calculated from the transmission weight vector, the received response vector and information on the intensity of the received signal measured by said measuring unit, is less than or equal to a threshold value.

13. A computer readable storage medium according to claim 10, wherein said instructing to switch to a virtual response vector is such that the signal strength value of the targeted terminal apparatus is estimated from a value of correlation between the received response vector and the virtual response vector.

14. A computer readable storage medium according to claim 12, wherein said instructing to increase the intensity of signals is such that the signal strength value of the targeted terminal apparatus is estimated from a value of correlation between the received response vector and the one of the virtual response vectors.

* * * * *